(12) United States Patent
O'Brien et al.

(10) Patent No.: US 12,021,280 B2
(45) Date of Patent: *Jun. 25, 2024

(54) HYDROGEN GAS DISPENSING SYSTEMS AND METHODS

(71) Applicant: Ivys Inc., Waltham, MA (US)

(72) Inventors: Christopher John O'Brien, Waltham, MA (US); Darryl Edward Pollica, Melrose, MA (US); Prabhu K. Rao, Newton, MA (US)

(73) Assignee: Ivys Inc., Waltham, MA (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/542,624

(22) Filed: Dec. 6, 2021

(65) Prior Publication Data

US 2022/0278343 A1  Sep. 1, 2022

Related U.S. Application Data

(63) Continuation of application No. 16/289,525, filed on Feb. 28, 2019, now Pat. No. 11,196,062, which is a
(Continued)

(51) Int. Cl.
*F17C 5/06* (2006.01)
*C01B 3/04* (2006.01)
(Continued)

(52) U.S. Cl.
CPC ......... *H01M 8/04201* (2013.01); *C01B 3/042* (2013.01); *C01B 3/50* (2013.01);
(Continued)

(58) Field of Classification Search
CPC .. F17C 13/02; F17C 7/02; F17C 5/06; H01M 8/04201; H01M 8/04
See application file for complete search history.

(56) References Cited

U.S. PATENT DOCUMENTS 6,755,225 B1   6/2004 Niedwiecki et al.
10,236,522 B2  3/2019 O'Brien et al.
(Continued)

FOREIGN PATENT DOCUMENTS

EP   3106739 A1   12/2016
JP   4607093 B2    1/2011
(Continued)

OTHER PUBLICATIONS

International Search Report and Written Opinion for International Application No. PCT/US2018/014044 dated Mar. 28, 2018.
(Continued)

*Primary Examiner* — Timothy P. Kelly
(74) *Attorney, Agent, or Firm* — Wolf, Greenfield & Sacks, P.C.

(57) ABSTRACT

According to at least one aspect, a hydrogen gas dispensing system is provided. The hydrogen gas dispensing system includes a source configured to provide a hydrogen gas, a storage device configured to store the hydrogen gas up to a first pressure level, a dispenser configured to dispense the hydrogen gas up to a second pressure level that is higher than the first pressure level, and a compressor configured to compress the hydrogen gas from the source up to the first pressure level for storage in the storage device and configured to compress the hydrogen gas from the storage device up to the second pressure level for dispensing via the dispenser. According to at least one aspect, the dispensing system comprises an input power port configured to receive input power and an output power port configured to deliver output power derived from the input power to charge an electric vehicle.

23 Claims, 11 Drawing Sheets

Related U.S. Application Data continuation of application No. 15/873,775, filed on Jan. 17, 2018, now Pat. No. 10,236,522.

(60) Provisional application No. 62/489,219, filed on Apr. 24, 2017, provisional application No. 62/455,308, filed on Feb. 6, 2017, provisional application No. 62/447,874, filed on Jan. 18, 2017, provisional application No. 62/447,400, filed on Jan. 17, 2017.

(51) Int. Cl.

| | | |
|---|---|---|
| *C01B 3/50* | (2006.01) | |
| *F17C 5/00* | (2006.01) | |
| *F17C 7/00* | (2006.01) | |
| *F17C 13/02* | (2006.01) | |
| *H01M 8/04082* | (2016.01) | |
| *H01M 8/04089* | (2016.01) | |
| *H01M 8/04664* | (2016.01) | |
| *H01M 8/0432* | (2016.01) | |
| *H01M 8/0438* | (2016.01) | |
| *H01M 8/0444* | (2016.01) | |
| *H01M 8/0656* | (2016.01) | |

(52) U.S. Cl.
CPC ............... *F17C 5/007* (2013.01); *F17C 5/06* (2013.01); *F17C 7/00* (2013.01); *F17C 13/025* (2013.01); *F17C 13/026* (2013.01); *H01M 8/04089* (2013.01); *H01M 8/04686* (2013.01); *C01B 2203/0465* (2013.01); *C01B 2203/0495* (2013.01); *F17C 2205/0111* (2013.01); *F17C 2205/0176* (2013.01); *F17C 2221/012* (2013.01); *F17C 2223/0123* (2013.01); *F17C 2223/033* (2013.01); *F17C 2225/0123* (2013.01); *F17C 2225/036* (2013.01); *F17C 2227/0157* (2013.01); *F17C 2227/0164* (2013.01); *F17C 2227/043* (2013.01); *F17C 2250/01* (2013.01); *F17C 2250/032* (2013.01); *F17C 2250/043* (2013.01); *F17C 2250/0439* (2013.01); *F17C 2250/0452* (2013.01); *F17C 2250/0626* (2013.01); *F17C 2265/065* (2013.01); *F17C 2270/0139* (2013.01); *F17C 2270/0184* (2013.01); *F17C 2270/0763* (2013.01); *H01M 8/04373* (2013.01); *H01M 8/04425* (2013.01); *H01M 8/0444* (2013.01); *H01M 8/0656* (2013.01); *H01M 2250/20* (2013.01); *H01M 2250/40* (2013.01); *Y02T 90/40* (2013.01)

(56) References Cited

U.S. PATENT DOCUMENTS

| | | |
|---|---|---|
| 11,196,062 B2 | 12/2021 | O'Brien et al. |
| 2003/0056510 A1 | 3/2003 | Ovshinsky et al. |
| 2003/0164202 A1 | 9/2003 | Graham et al. |
| 2006/0068246 A1 | 3/2006 | Matsuo et al. |
| 2006/0118575 A1 | 6/2006 | Boyd et al. |
| 2007/0181083 A1 | 8/2007 | Fulton et al. |
| 2010/0025232 A1 | 2/2010 | Kelly et al. |
| 2010/0154924 A1 | 6/2010 | Casey |
| 2011/0077809 A1 | 3/2011 | Leary |
| 2011/0115425 A1 | 5/2011 | Olsson |
| 2013/0020993 A1 | 1/2013 | Taddeo et al. |
| 2015/0153005 A1 | 6/2015 | Takano et al. |
| 2015/0167895 A1 | 6/2015 | Nagura et al. |
| 2017/0328521 A1 | 11/2017 | Grabski |
| 2018/0205102 A1 | 7/2018 | O'Brien et al. |
| 2019/0363382 A1 | 11/2019 | O'Brien et al. |

FOREIGN PATENT DOCUMENTS

| | | |
|---|---|---|
| JP | 2015-113949 A | 6/2015 |
| JP | 2016-196929 A | 11/2016 |
| KR | 10-1136012 B1 | 4/2012 |
| WO | WO 2018/136508 A1 | 7/2018 |

OTHER PUBLICATIONS

International Preliminary Report on Patentability for International Application No. PCT/US2018/014044 dated Aug. 1, 2019.

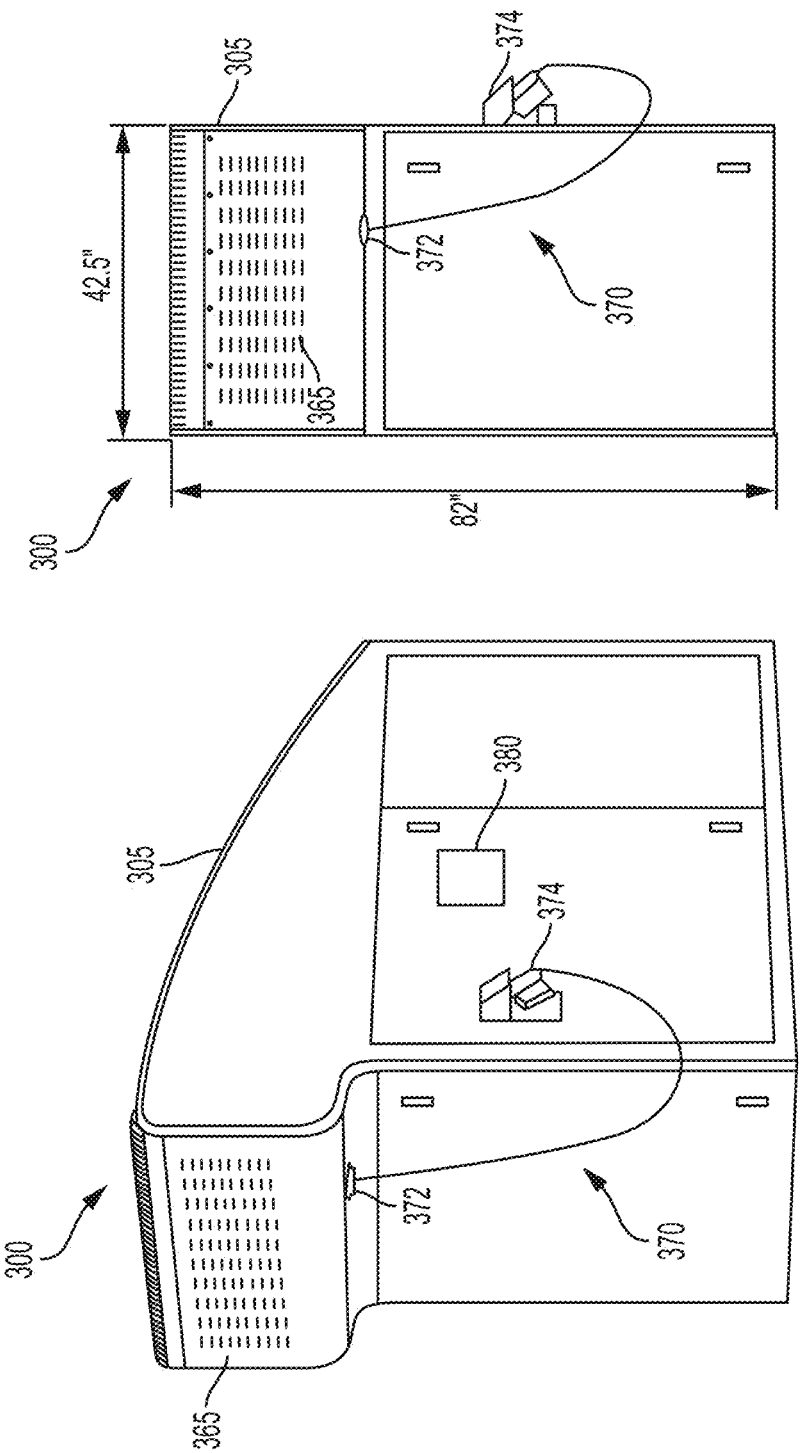

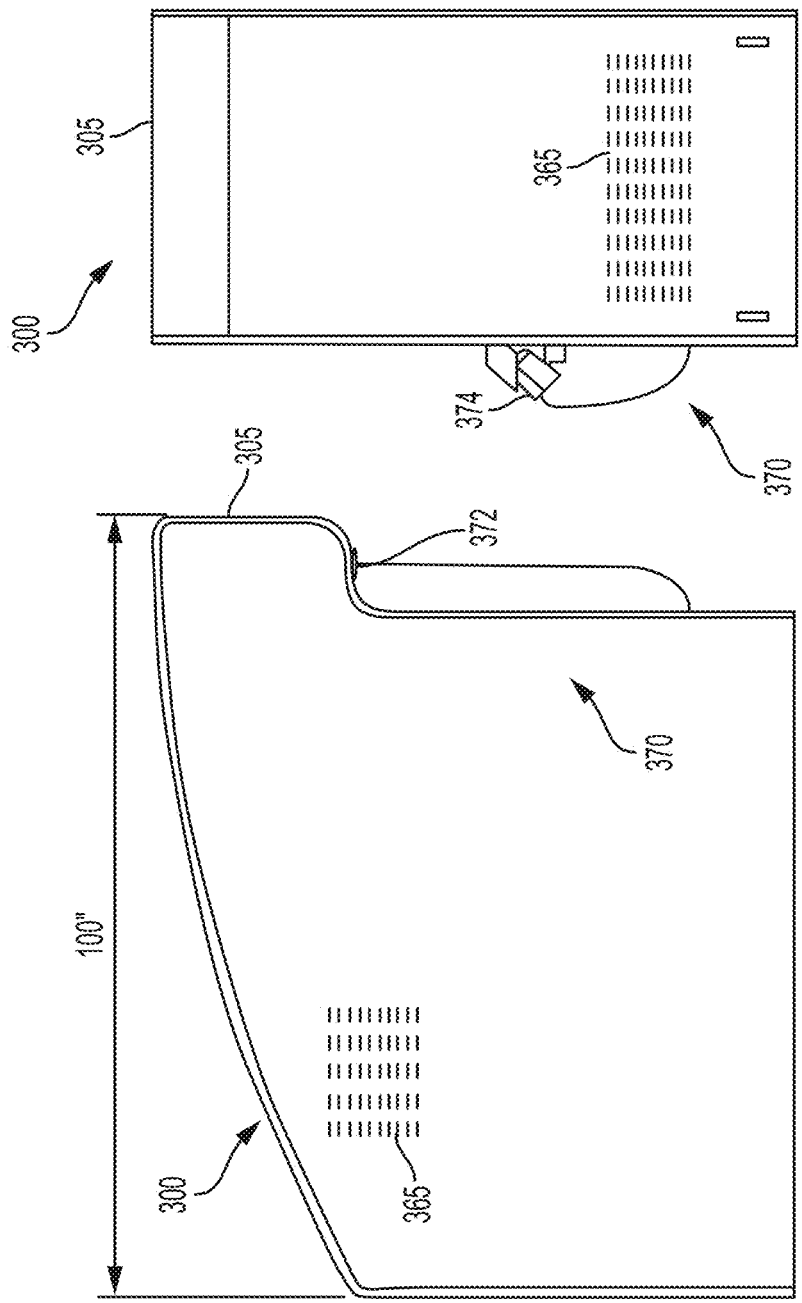

HYDROGEN GAS DISPENSING SYSTEMS AND METHODS

CROSS-REFERENCE TO RELATED APPLICATIONS

This application claims the benefit under 35 U.S.C. § 120 and is a continuation (CON) of U.S. application Ser. No. 16/289,525, entitled "HYDROGEN GAS DISPENSING SYSTEMS AND METHODS," filed on Feb. 28, 2019, which claims the benefit under 35 U.S.C. § 120 and is a continuation (CON) of U.S. application Ser. No. 15/873,775, entitled "HYDROGEN GAS DISPENSING SYSTEMS AND METHODS" filed on Jan. 17, 2018, which claims the benefit under 35 U.S.C. § 119(e) of each of U.S. Provisional Application Ser. No. 62/447,400, titled "HYDROGEN FUEL CELL REFUELER SYSTEM AND METHODS" filed on Jan. 17, 2017, U.S. Provisional Application Ser. No. 62/447,874, titled "HYDROGEN FUEL CELL REFUELER SYSTEM AND METHODS" filed on Jan. 18, 2017, U.S. Provisional Application Ser. No. 62/455,308, titled "HYDROGEN FUEL CELL REFUELER SYSTEM AND METHODS" filed on Feb. 6, 2017, and U.S. Provisional Application Ser. No. 62/489,219, titled "HYDROGEN DISPENSING METHODS AND APPARATUS" filed on Apr. 24, 2017, each of the above applications of which is hereby incorporated herein by reference in its entirety.

BACKGROUND

Hydrogen fuel cell vehicles (HFCV) are emerging as a zero-emission alternative to internal combustion engine vehicles. HFCVs operate by providing compressed hydrogen to a fuel cell stack which converts the hydrogen into electricity to drive an electric motor. Similar to internal combustion engine vehicles, HFCVs are equipped with fuel tanks that must be refilled periodically. In an effort to emulate the refueling paradigm and user experience of traditional gasoline refueling stations, conventional hydrogen refueling stations are large capacity, complex, and expensive facilities. In particular, conventional hydrogen refueling stations are designed to service regular vehicle traffic and, therefore, require large storage capacity to ensure continuous fuel availability. Such large storage capacity is expensive, needs a significant footprint, and requires extensive safety measures to be put into place. In addition, to achieve fill times comparable to traditional internal combustion engine vehicles, expensive and complex cooling systems must be implemented to prevent overheating when the compressed hydrogen is dispensed into the fuel tank of the HFCV.

SUMMARY

According to at least one aspect, a hydrogen gas dispensing system is provided. The hydrogen gas dispensing system comprises: a source configured to provide hydrogen gas; a storage device configured to store the hydrogen gas up to a first pressure level; a dispenser configured to dispense the hydrogen gas up to a second pressure level that is higher than the first pressure level; and a compressor fluidly coupled to the source, the storage device, and the dispenser, the compressor configured to compress the hydrogen gas from the source up to the first pressure level for storage and configured to compress the hydrogen gas from the storage device up to the second pressure level for dispensing via the dispenser.

In some embodiments, the system further comprising a controller configured to detect a storage pressure level of the storage device when a vehicle is coupled to the hydrogen gas dispensing system via the dispenser, the controller further configured to: cause hydrogen gas to flow from the storage device to a fuel tank of the vehicle via the dispenser when the storage pressure level is greater than a threshold pressure level; and cause hydrogen gas from the storage device to be compressed by the compressor before being dispensed to the fuel tank of the vehicle via the dispenser when the storage pressure level is less than the threshold pressure level.

In some embodiments, the controller is configured to detect a vehicle pressure level of the fuel tank of the vehicle coupled to the coupled to the hydrogen gas dispensing system via the dispenser, and wherein the threshold pressure level is relative to the vehicle pressure level. In some embodiments, the threshold pressure level is substantially the vehicle pressure level of the fuel tank. In some embodiments, the source comprises an external source of hydrogen gas.

In some embodiments, the first pressure level is greater than or equal to approximately 5,000 and less than or equal to approximately 8,000 pounds per square inch (PSI) and the second pressure level is greater than or equal to approximately 8,000 PSI and less than or equal to approximately 12,000 PSI. In some embodiments, the first pressure level is approximately 6,000 pounds per square inch (PSI) and the second pressure level is approximately 10,000 PSI.

In some embodiments, the storage device comprises a plurality of storage tanks. In some embodiments, the system further comprises a fire retardant material that at least partially encloses the storage device. In some embodiments, the storage device is configured to store no more than approximately 10 kilograms of hydrogen gas.

In some embodiments, the source comprises an electrolyzer configured to receive water and produce the hydrogen gas using the water. In some embodiments, the system further comprises a hydrogen gas purifier fluidly coupled between the electrolyzer and the compressor, the hydrogen gas purifier being configured to remove at least some oxygen and/or at least some water from the hydrogen gas produced by the electrolyzer.

In some embodiments, the system further comprises an enclosure encasing at least the storage device and comprising an air vent; and an air circulation device disposed in the enclosure and configured to provide ventilation for the enclosure. In some embodiments, the air circulation device comprises at least one fan arranged to force air from inside the enclosure to an external environment through the air vent.

In some embodiments, the system further comprises: a hydrogen gas sensor disposed in the enclosure and configured to detect hydrogen gas in the enclosure; and a circuit communicatively coupled to the hydrogen gas sensor and configured to shut down at least one component of the hydrogen gas dispensing system when a hydrogen gas concentration detected by the hydrogen gas sensor exceeds a threshold.

In some embodiments, the system further comprises: a pressure sensor disposed in the enclosure and configured to measure a change in air pressure caused by air being forced through the air vent; and a circuit communicatively coupled to the air pressure sensor and configured to shut down at least one component of the hydrogen gas dispensing system when an air pressure level detected by the air pressure sensor indicates an issue with air circulation.

In some embodiments, the system further comprises: a temperature sensor disposed in the enclosure and configured to measure a temperature of air in the enclosure; and a circuit communicatively coupled to the temperature sensor and configured to shut down at least one component of the hydrogen gas dispensing system when a temperature level detected by the temperature sensor exceeds a threshold.

In some embodiments, the system further comprises: a heater disposed in the enclosure; a temperature sensor disposed in the enclosure and configured to measure a temperature of air in the enclosure; and a circuit communicatively coupled to the temperature sensor and the heater, the circuit being configured to control operation of the heater based on a temperature level detected by the temperature sensor.

In some embodiments, the enclosure comprises: a first compartment having at least the storage device disposed therein; a second compartment having at least the electrolyzer disposed therein; and a fire retardant material disposed between the first compartment and the second compartment.

In some embodiments, the system further comprises a safety system for controlling powering and depowering components of the hydrogen gas dispensing system, the safety system comprising: the air circulation device; a pressure sensor disposed in the enclosure and configured to measure a change in air pressure to confirm correct operation of the air circulation device; a hydrogen gas sensor disposed in the enclosure and configured to detect hydrogen gas in the enclosure; a temperature sensor disposed in the enclosure and configured to measure a temperature of air in the enclosure; and a safety controller coupled to the pressure sensor, the hydrogen gas sensor and the temperature sensor and configured to provide power to components of the hydrogen gas dispensing system, wherein the safety controller is configured to power and depower components of the hydrogen gas dispensing system based, at least in part, on indications received from the pressure sensor, the hydrogen gas sensor and the temperature sensor.

In some embodiments, upon power up of the hydrogen gas dispensing system, the safety controller engages the air circulation device, the pressure sensor, the hydrogen gas sensor and the temperature sensor and provides operational power to other components of the hydrogen gas dispensing system only when the safety system confirms safe operation. In some embodiments, the safety controller is configured to power down the hydrogen gas dispensing system if any of the pressure sensor, hydrogen gas sensor and/or temperature sensor signal unsafe operating conditions.

In some embodiments, the hydrogen gas dispensing system is configured to provide a visual indication of a fill level of the storage device. In some embodiments, the system further comprises: a lighting system configured to provide light in a selected one of a plurality of colors based on a control signal; and a circuit coupled to the lighting system and configured to generate the control signal based on the fill level of the storage device.

In some embodiments, the system further comprises: an input power port configured to receive input power from a power source; and an output power port configured to deliver output power derived from the input power received at the input power port to charge an electric vehicle.

In some embodiments, the input power port is configured to receive single-phase mains electricity from the power source. In some embodiments, the output power port is configured to deliver output power suitable for level-1 charging of the electric vehicle. In some embodiments, the input power port is configured to receive single-phase mains electricity at approximately 120V and the output power port is configured to deliver power at approximately 120V to deliver level-1 charging to the electric vehicle.

In some embodiments, the output power port is configured to deliver output power suitable for level-2 charging of the electric vehicle. In some embodiments, the input power port is configured to receive single-phase mains electricity at approximately 240V and the output power port is configured to deliver power at approximately 240V to deliver level-2 charging to the electric vehicle.

In some embodiments, the system further comprises power conversion circuitry configured to convert the input power into the output power. In some embodiments, the input power port is configured to receive three-phase power from the power source and the power conversion circuitry is configured to convert the three-phase power into single-phase power. In some embodiments, the power conversion circuitry is configured to convert the three-phase power into single-phase power suitable for level-1 charging of the electric vehicle. In some embodiments, the power conversion circuitry is configured to convert the three-phase power into single-phase power suitable for level-2 charging of the electric vehicle.

In some embodiments, the input power is alternating current (AC), wherein the power conversion circuitry is configured to convert the AC input power to direct current (DC) power. In some embodiments, the power conversion circuitry is configured to convert the AC input power to DC output power suitable for fast DC charging of the electric vehicle.

According to at least one aspect, a method of operating a hydrogen gas dispensing system comprising a compressor is provided. The method comprises providing a hydrogen gas to the compressor; compressing the hydrogen gas from the source up to a first pressure level using the compressor; storing the hydrogen gas from the compressor in a storage device; compressing the hydrogen gas from the storage device up to a second pressure level that is higher than the first pressure level using the compressor; and dispensing the hydrogen gas from the compressor.

In some embodiments, providing the hydrogen gas to the compressor comprises receiving water and generating the hydrogen gas by an electrolyzer using the water. In some embodiments, storing the hydrogen gas from the compressor in the storage device comprises storing no more than approximately 10 kilograms of the hydrogen gas in the storage device. In some embodiments, the method further comprises measuring a fill level of the storage device; and providing a visual indicating of the fill level of the storage device.

In some embodiments, the method further comprises forcing air from inside an enclosure comprising an air vent and encasing at least the storage device to an external environment through the air vent. In some embodiments, the method further comprises detecting a presence of hydrogen gas in air being forced through the air vent using the hydrogen gas sensor and shutting down at least one component of the dispensing system when a hydrogen gas concentration detected by the hydrogen gas sensor exceeds a threshold. In some embodiments, the method further comprises measuring a change in air pressure caused by air being forced through the air vent using an air pressure sensor and shutting down at least one component of the dispensing system when an air pressure level detected by the air pressure sensor indicates that air is not being forced through the air vent.

In some embodiments, the method further comprises measuring a temperature of air in the enclosure using a temperature sensor; and shutting down at least one component of the hydrogen gas fueling system when a temperature level detected by the temperature sensor exceeds a threshold. In some embodiments, the method further comprises measuring a temperature of air in the enclosure using a temperature sensor; and control operation of heater disposed in the enclosure based on a temperature level detected by the temperature sensor.

According to at least one aspect, a hybrid dispensing system is provided. The hybrid dispensing system comprises a source configured to provide hydrogen gas, a storage device configured to store the hydrogen gas, a dispenser configured to dispense the hydrogen gas, an input power port configured to receive input power from a power source, and an output power port configured to deliver output power derived from the input power received at the input power port to charge an electric vehicle.

In some embodiments, the storage device is configured to store the hydrogen gas up to a first pressure level, and the dispenser is configured to dispense the hydrogen gas up to a second pressure level that is higher than the first pressure level, the hybrid dispensing system further comprising a compressor fluidly coupled to the source, the storage device, and the dispenser, the compressor configured to compress the hydrogen gas from the source up to the first pressure level for storage and configured to compress the hydrogen gas from the storage device up to the second pressure level for dispensing via the dispenser.

In some embodiments, the input power port is configured to receive single-phase mains electricity from the power source. In some embodiments, the output power port is configured to deliver output power suitable for level-1 charging of the electric vehicle. In some embodiments, the input power port is configured to receive single-phase mains electricity at approximately 120V and the output power port is configured to deliver power at approximately 120V to deliver level-1 charging to the electric vehicle. In some embodiments, the output power port is configured to deliver output power suitable for level-2 charging of the electric vehicle. In some embodiments, the input power port is configured to receive single-phase mains electricity at approximately 240V and the output power port is configured to deliver power at approximately 240V to deliver level-2 charging to the electric vehicle.

In some embodiments, the system further comprises power conversion circuitry configured to convert the input power into the output power. In some embodiments, the input power port is configured to receive three-phase power from the power source and the power conversion circuitry is configured to convert the three-phase power into single-phase power. In some embodiments, the power conversion circuitry is configured to convert the three-phase power into single-phase power suitable for level-1 charging of the electric vehicle. In some embodiments, the power conversion circuitry is configured to convert the three-phase power into single-phase power suitable for level-2 charging of the electric vehicle.

In some embodiments, the input power is alternating current (AC), wherein the power conversion circuitry is configured to convert the AC input power to direct current (DC) power. In some embodiments, the power conversion circuitry is configured to convert the AC input power to DC output power suitable for fast DC charging of the electric vehicle.

In some embodiments, the system further comprises a controller configured to detect a storage pressure level of the storage device when a vehicle is coupled to the hydrogen gas dispensing system via the dispenser, the controller further configured to: cause hydrogen gas to flow from the storage device to a fuel tank of the vehicle via the dispenser when the storage pressure level is greater than a threshold pressure level; and cause hydrogen gas from the storage device to be compressed by the compressor before being dispensed to the fuel tank of the vehicle via the dispenser when the storage pressure level is less than the threshold pressure level.

In some embodiments, the controller is configured to detect a vehicle pressure level of the fuel tank of the vehicle coupled to the coupled to the hydrogen gas dispensing system via the dispenser, and wherein the threshold pressure level is relative to the vehicle pressure level. In some embodiments, the threshold pressure level is substantially the vehicle pressure level of the fuel tank. In some embodiments, the source comprises an external source of hydrogen gas.

In some embodiments, the first pressure level is greater than or equal to approximately 5,000 and less than or equal to approximately 8,000 pounds per square inch (PSI) and the second pressure level is greater than or equal to approximately 8,000 PSI and less than or equal to approximately 12,000 PSI. In some embodiments, the first pressure level is approximately 6,000 pounds per square inch (PSI) and the second pressure level is approximately 10,000 PSI.

In some embodiments, the storage device comprises a plurality of storage tanks. In some embodiments, the system further comprises a fire retardant material that at least partially encloses the storage device. In some embodiments, the storage device is configured to store no more than approximately 10 kilograms of hydrogen gas.

In some embodiments, the source comprises an electrolyzer configured to receive water and produce the hydrogen gas using the water. In some embodiments, the system further comprises a hydrogen gas purifier fluidly coupled between the electrolyzer and the compressor, the hydrogen gas purifier being configured to remove at least some oxygen and/or at least some water from the hydrogen gas produced by the electrolyzer.

In some embodiments, the system further comprises an enclosure encasing at least the storage device and comprising an air vent; and an air circulation device disposed in the enclosure and configured to provide ventilation for the enclosure. In some embodiments, the air circulation device comprises at least one fan arranged to force air from inside the enclosure to an external environment through the air vent.

In some embodiments, the system further comprises a hydrogen gas sensor disposed in the enclosure and configured to detect hydrogen gas in the enclosure; and a circuit communicatively coupled to the hydrogen gas sensor and configured to shut down at least one component of the hydrogen gas dispensing system when a hydrogen gas concentration detected by the hydrogen gas sensor exceeds a threshold.

In some embodiments, the system further comprises a pressure sensor disposed in the enclosure and configured to measure a change in air pressure caused by air being forced through the air vent; and a circuit communicatively coupled to the air pressure sensor and configured to shut down at least one component of the hydrogen gas dispensing system when an air pressure level detected by the air pressure sensor indicates an issue with air circulation.

In some embodiments, the system further comprises a temperature sensor disposed in the enclosure and configured to measure a temperature of air in the enclosure; and a circuit communicatively coupled to the temperature sensor and configured to shut down at least one component of the hydrogen gas dispensing system when a temperature level detected by the temperature sensor exceeds a threshold.

In some embodiments, the system further comprises a heater disposed in the enclosure; a temperature sensor disposed in the enclosure and configured to measure a temperature of air in the enclosure; and a circuit communicatively coupled to the temperature sensor and the heater, the circuit being configured to control operation of the heater based on a temperature level detected by the temperature sensor.

In some embodiments, the system further comprises a first compartment having at least the storage device disposed therein; a second compartment having at least the electrolyzer disposed therein; and a fire retardant material disposed between the first compartment and the second compartment.

In some embodiments, the system further comprises a safety system for controlling powering and depowering components of the hydrogen gas dispensing system, the safety system comprising: the air circulation device; a pressure sensor disposed in the enclosure and configured to measure a change in air pressure to confirm correct operation of the air circulation device; a hydrogen gas sensor disposed in the enclosure and configured to detect hydrogen gas in the enclosure; a temperature sensor disposed in the enclosure and configured to measure a temperature of air in the enclosure; and a safety controller coupled to the pressure sensor, the hydrogen gas sensor and the temperature sensor and configured to provide power to components of the hydrogen gas dispensing system, wherein the safety controller is configured to power and depower components of the hydrogen gas dispensing system based, at least in part, on indications received from the pressure sensor, the hydrogen gas sensor and the temperature sensor.

In some embodiments, upon power up of the hydrogen gas dispensing system, the safety controller engages the air circulation device, the pressure sensor, the hydrogen gas sensor and the temperature sensor and provides operational power to other components of the hydrogen gas dispensing system only when the safety system confirms safe operation. In some embodiments, the safety controller is configured to power down the hydrogen gas dispensing system if any of the pressure sensor, hydrogen gas sensor and/or temperature sensor signal unsafe operating conditions. In some embodiments, the hydrogen gas dispensing system is configured to provide a visual indication of a fill level of the storage device.

In some embodiments, the system further comprises a lighting system configured to provide light in a selected one of a plurality of colors based on a control signal; and a circuit coupled to the lighting system and configured to generate the control signal based on the fill level of the storage device.

BRIEF DESCRIPTION OF DRAWINGS

Various aspects and embodiments of the disclosed technology will be described with reference to the following figures. It should be appreciated that the figures are not necessarily drawn to scale. Items appearing in multiple figures are indicated by the same reference number in all the figures in which they appear.

FIGS. 3A-3D illustrate views of an exemplary implementation of a hydrogen gas dispensing system as a hydrogen refueling appliance, in accordance with some embodiments;

DETAILED DESCRIPTION

Figure 1A:
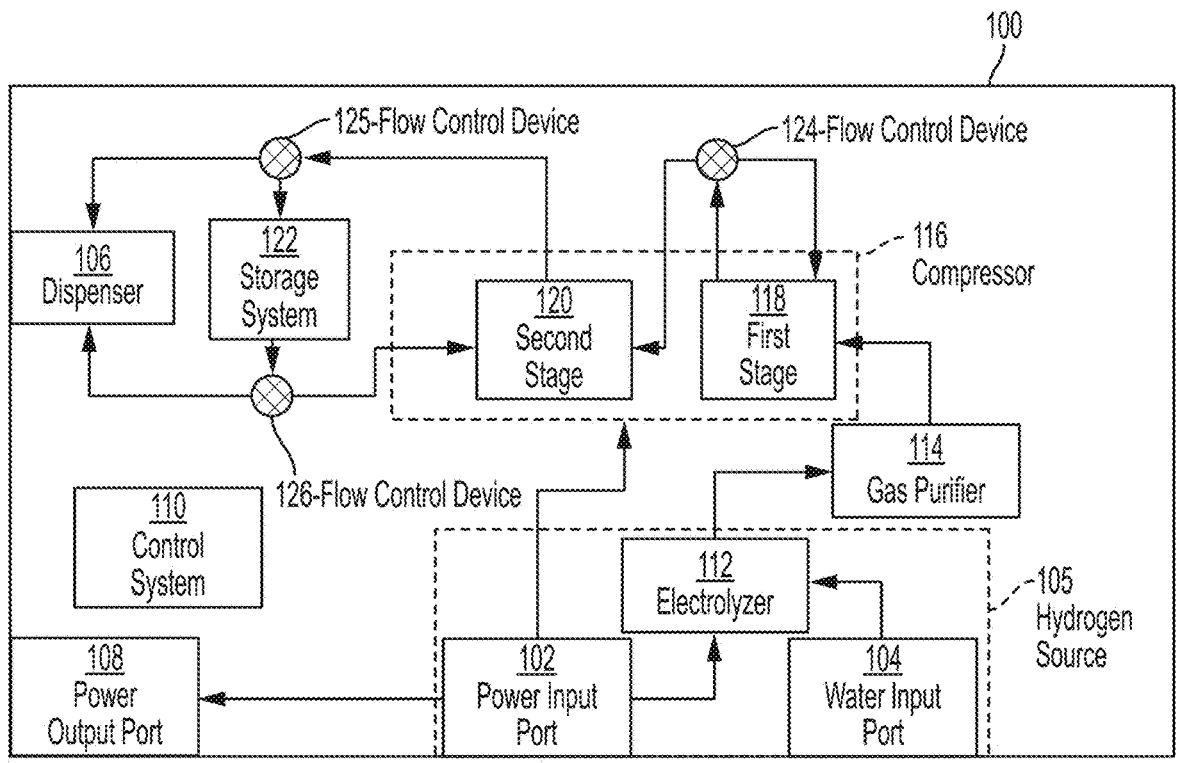
FIG. 1A illustrates a block diagram of an exemplary hydrogen gas dispensing system, in accordance with some embodiments.

Conventional refueling stations for hydrogen fuel cell vehicles (HFCVs) are large, complex and expensive facilities patterned after refueling stations for internal combustion engine powered vehicles. Such facilities are designed to provide essentially continuous availability and supply of fuel at fill times that are comparable to that of gasoline, thus requiring large storage capacity and expensive cooling systems. The inventors have recognized that while this paradigm is well suited for the petroleum based market, it is less suited to HFCVs due in part to differences between storage and dispensing of gasoline and compressed hydrogen and in part to differences between the respective markets.

The inventors have developed a hydrogen gas dispensing system for dispensing compressed hydrogen to refill hydrogen tanks on HFCVs, in accordance with some embodiments. The hydrogen gas dispensing system may be advantageously designed as a stand-alone unit (e.g., a stand-alone hydrogen refueling appliance) that uses readily accessible resources, such as water and electricity, to generate hydrogen to refill hydrogen tanks. Further, the hydrogen gas dispensing system may be constructed to have a compact footprint. For example, the hydrogen gas dispensing system may require a footprint that is no larger than a single parking space (e.g., 9 feet by 18 feet). Thereby, the hydrogen gas dispensing system may be constructed at any location that has, for example, access to a water line and a power line (e.g., a parking lot of a shopping center, a parking garage for an office building, compact refueling island for a community or neighborhood, etc.). Accordingly, a hydrogen refueling experience for a user may be provided that is similar to a destination charging experience for an electric vehicle. For example, a user can park their vehicle, connect their vehicle to the hydrogen gas dispensing system, and engage in other activities, such as shopping, working, or tasks around the house, while the hydrogen gas dispensing system refuels their vehicle. Given the relatively short fill times of some embodiments of the hydrogen gas dispensing systems described herein, a consumer may also wait in proximity to the vehicle while it fills similar to the model for conventional gasoline stations.

In some embodiments, the hydrogen gas dispensing system may be constructed to produce, compress, and dispense its own hydrogen to HFCVs using only a connection to a water source (e.g., a connection to a town water line) and a connection to a power source (e.g., a connection to a power grid, such as a three-phase power hook-up or a connection to single phase mains electricity). For example, the hydrogen gas dispensing system may comprise a hydrogen source that is configured to generate hydrogen gas for the system, such as an electrolyzer that separates the hydrogen from water using electricity. The hydrogen gas from the hydrogen source may be compressed using a single or multiple stage compressor for storage in a storage device, such as a set of one or more storage tanks. The hydrogen gas may be stored in the storage device at a lower pressure level than the maximum pressure at which the hydrogen gas may be dispensed to a HFCV via a dispenser to reduce the cost and complexity of the storage device and the dispenser. For example, the hydrogen gas may be stored up to a pressure of approximately 6,000 pounds per square inch (PSI) while the hydrogen gas dispensing system may dispense the hydrogen gas up to a pressure of approximately 10,000 PSI. The single or multiple stage compressor may also be configured to use some or all of its available compression stages to boost the pressure of the hydrogen gas from the storage device in cases where the pressure required to dispense the hydrogen gas to the HFCV is greater than the pressure at which the hydrogen gas is stored in the storage device.

Additionally, the hydrogen gas dispensing system may advantageously include an electric vehicle charger with the hydrogen gas dispensing components. For example, the hydrogen gas dispensing system may comprise a level-1 charger and/or a level-2 charger. Thereby, the hydrogen gas dispensing system may charge electric vehicles as well as refuel HFCVs (e.g., simultaneously and/or in direct succession). Further, the electric vehicle charger may be integrated into the hydrogen gas dispensing system without a significant increase in cost, complexity, or size. For example, the electric vehicle charger may be connected to the same power source that provides power to the hydrogen gas dispensing or generation components in the hydrogen gas dispensing system. Thereby, no additional power connections may be required.

Following below are more detailed descriptions of various concepts related to, and embodiments of, hydrogen gas dispensing systems. It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1A shows a block diagram of a hydrogen gas dispensing system 100 that is configured to dispense hydrogen gas to a vehicle (e.g., a HFCV) using a dispenser 106 and/or provide power to a vehicle (e.g., an electric vehicle or a HFCV) using a power output port 108. It should be appreciated that power output port 108 may be present in hybrid dispensing systems configured to dispense hydrogen gas to HFCVs and deliver electric power to charge batteries of electric or hybrid vehicles, but may be omitted in hydrogen gas dispensing systems that dispense hydrogen gas, but do not provide the ability to charge electric car batteries. As shown, the system 100 comprises an electrolyzer 112 to generate hydrogen gas using water from a water input port 104 and power from a power input port 102. The water input port 104 and power input port 102 can be any suitable connection that allows the hydrogen gas dispensing system 100 to connect to the respective source.

In the embodiment illustrated in FIG. 1A, the electrolyzer 112 in combination with the power input port 102 and the water input port 104 form a hydrogen source 105 that is configured to provide hydrogen gas to one or more components in the hydrogen gas dispensing system 100. Electrolyzers are well-known components and any suitable type may be used as the electrolyzer 112. The electrolyzer 112 may be selected to be of a size and capacity suitable for the particular installment of system 100. For example, the electrolyzer 112 may be of the size and capacity to fill storage system 122 from an empty to a full state in approximately 48 hours, approximately 24 hours, approximately 12 hours, approximately 6 hours, etc., or any time that is suitable for the refueling paradigm of hydrogen gas dispensing system 100. The hydrogen gas from the hydrogen source 105 (e.g., hydrogen gas produced by electrolyzer 112) may be purified by a gas purifier 114 before being provided to downstream components of the system. According to some embodiments, gas purifier 114 may be unnecessary. For example, according to some embodiments, electrolyzer 112 may produce hydrogen gas at a sufficient purity so that further purification stage(s) may not be needed. In embodiments that utilize a gas purifier, gas purifier 114 may be configured to purify the hydrogen gas from the hydrogen source 105 to make the hydrogen gas suitable for filling a vehicle. The gas purifier 114 may be configured to remove any of a variety of undesired components from the hydrogen gas provided by the hydrogen source 105. For example, the hydrogen gas from the source 105 may be mixed with water and the gas purifier 114 may be configured to remove at least some of the water.

Figure 1B:
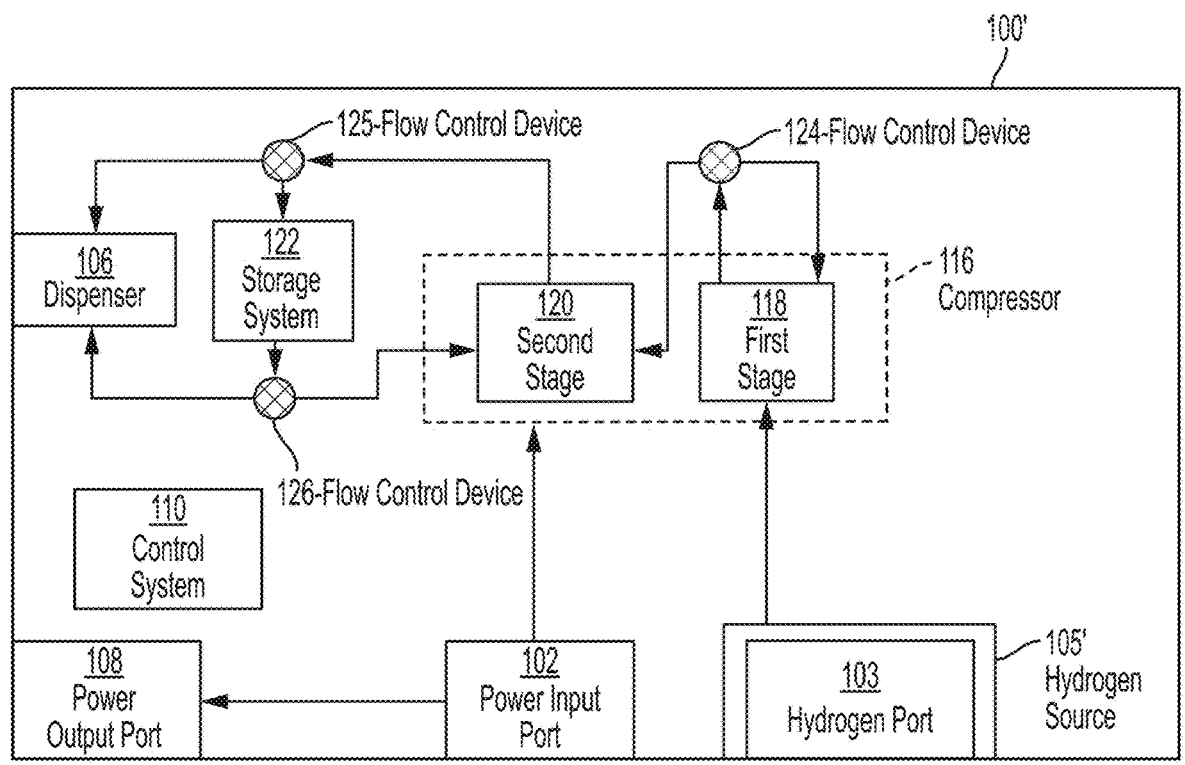
FIG. 1B illustrates a block diagram of an exemplary hydrogen gas dispensing system, in accordance with some embodiments.

FIG. 1B illustrates an alternative embodiment of a hydrogen gas dispensing system 100', wherein the hydrogen gas source 105' comprises a hydrogen gas port configured to connect to an external hydrogen gas source, such as an external storage tank, external hydrogen gas generating facility, etc. Hydrogen gas dispensing system 100' can be used in connection with an existing external hydrogen gas source to take advantage of the dispensing capabilities of the multi-function compressor discussed in further detail below. Hydrogen gas dispensing system 100' is shown without a gas purifier as the external hydrogen gas source may produce hydrogen gas of sufficient purity. However, it should be appreciated that a gas purifier (e.g., gas purifier 114 illustrated in connection with FIG. 1A) may alternatively be used to purify the hydrogen gas (e.g., to remove water or other impurities from the hydrogen gas), as the aspects are not limited in this respect.

In the embodiments illustrated in FIGS. 1A and 1B, the hydrogen gas dispensing system comprises a compressor 116 that is configured to facilitate a dual mode refueling appliance. The compressor 116 may receive power from the power input port 102. The compressor 116 may be configured to compress the received hydrogen gas up to a first pressure level, such as approximately 6,000 PSI, for storage in a storage system 122. It should be appreciated that the first pressure level may selected as appropriate for a given dispensing system (e.g., in a range between approximately 5,000 PSI and 8,000 PSI). The compressor 116 may be further configured to compress the hydrogen gas from the storage 122 up to a second pressure level that is higher than the first pressure level, such as approximately 10,000 PSI, for dispensing using the dispenser 106 (e.g., when the pressure in the tank of a HFCV is greater than the pressure of the hydrogen gas in storage 122). Similarly, the second pressure level can be selected as appropriate for a given dispensing system (e.g., in a range between 6,000 PSI and 15,000 PSI).

As shown, the compressor 116 may comprise multiple stages including a first stage 118 and a second stage 120. Each of the first and second stages 118 and 120, respectively, may be configured to compress hydrogen gas up to a different pressure level. For example, hydrogen gas from the hydrogen source 105 may be compressed to a first pressure level by the first stage 118 and further compressed to a second, higher pressure level by the second stage 120. The flow of hydrogen gas within the system 100 may be controlled by a set of flow control devices, shown as flow control devices 124, 125, and 126. The flow control device 124 may direct hydrogen gas from the first stage 118 to the second stage 120 of the compressor in operation modes where hydrogen gas is being added to the storage system 122 or direct the hydrogen gas from the first stage 118 back to the first stage 118 in other operation modes (e.g., where the system 100 is dispensing hydrogen from the storage system 122). The flow control device 125 may direct hydrogen gas from the second stage 120 to the storage system 122 in operation modes where the storage system 122 is being filled or direct hydrogen gas from the second stage 120 directly to the dispenser 106 in operation modes where the pressure of the hydrogen gas from the storage system 122 needs to be boosted by the second stage 120 before going to dispenser 106. The flow control device 126 may direct hydrogen gas directly from the storage system 122 to the dispenser 106 in operation modes where the second stage 120 is bypassed or direct the hydrogen gas to the second stage 120 in operation modes where the pressure of the hydrogen gas from the storage system 122 needs to be boosted by the second stage 120 before going to dispenser 106.

The hydrogen gas dispensing system 100/100' may further comprise a control system 110 to control the operation of one or more components within the system 100/100'. According to some embodiments, control system 110 may receive power from power input port 102.

As discussed above, the hydrogen source may generate hydrogen gas within the dispensing system (e.g., hydrogen source 105 comprising an electrolyzer 112, power port 102 and water port 104) or may be configured to connect to an external hydrogen gas source (e.g., hydrogen source 105' comprising a hydrogen gas port to connect to an external source), such as a large capacity storage tank that is located remotely from the system. According to some embodiments, a hydrogen gas dispensing system may be configured to generate hydrogen gas internally (e.g., via an on-board electrolyzer) and configured to connect to an external hydrogen gas source. For example, hydrogen source 105 illustrated in FIG. 1A may also include a hydrogen gas port 103 to connect to an external hydrogen gas source, providing the option of producing hydrogen gas internally, connecting to an external source, or both, providing a flexible system that can be utilized in a variety of refueling installations.

The compressor 116 may be configured to compress hydrogen gas for storage in the storage system 122 and/or compress hydrogen gas for dispensing via the dispenser 106.

The compressor 116 may have multiple stages, such as the first stage 118 and the second stage 120. Each of the stages in the compressor 116 may be configured to compress hydrogen gas up to a different pressure level. For example, the first stage 118 may be configured to compress hydrogen from the gas purifier 114 up to a first pressure level and the second stage 120 that is configured to compress hydrogen gas up to a second pressure level that is higher than the first pressure level. The design of the system 100 may permit the compressor 116 to both compress hydrogen gas from the hydrogen source 105 for application to the storage system 122 and to compress the hydrogen gas from the storage system 122 for dispensing. Such a design may provide numerous benefits. For example, the system 100/100' may be able to store the hydrogen gas in the storage system 122 at a lower pressure than the maximum pressure at which hydrogen gas may be dispensed and, thereby, reduces the cost, complexity, and size of the system 100/100'. The relatively low pressure of the hydrogen gas stored on the system may simplify the safety measures needed to satisfy the regulatory requirements. Additionally, all (or nearly all) of the hydrogen gas from the storage system 122 may be dispensed regardless of the pressure differential between the pressure of the hydrogen in the storage system 122 and the pressure in the tank into which the hydrogen is being dispensed. Thereby, the storage capacity of the storage system 122 may be reduced without substantially impacting the performance of the system 100/100'. In this manner, the compressor may function to provide a boost to utilize as much stored hydrogen gas as possible and/or to provide the needed pressure to fill the tank of a HFCV.

It should be appreciated that the compressor 116 may have more or less than the two compressor stages shown in FIGS. 1A and 1B. For example, the storage system 122 may comprise two storage tanks that are each configured to store hydrogen gas up to a different pressure level. In this example, the compressor 116 may use different combinations of its stages to compress hydrogen up to a first pressure level for the first storage tank, a second compressor stage to compress hydrogen up to a second pressure level for the second storage tank, and a third compressor stage to compress hydrogen up to a third pressure level for dispensing via the dispenser 106. In another example, the compressor 116 may have only a single stage. In this example, the first stage 118 and the flow control device 124 may be omitted from the system 100 and the output of the gas purifier 114 may be provided directly to the second stage 120.

The flow control device 124 may be configured to direct hydrogen gas from the first stage 118 to the second stage 120 and/or back to the first stage 118. The flow control device 124 may be implemented as a set of one or more control valves that are configurable to control the flow of hydrogen gas depending on the operating conditions of the system. For example, the flow control device 124 may be controlled to be in a first configuration wherein the output of the first stage 118 is connected to the second stage 120 and controlled to be in a second configuration wherein the output of the first stage 118 is directed back to the first stage 118. The control valve(s) may be placed in the first configuration may when the system 100/100' is storing generated and/or received hydrogen gas in storage system 122. The control valve(s) may be placed in the second configuration in other instances such as when the second stage 120 is boosting the pressure of hydrogen from the storage system 122 for dispensing via dispenser 106. The configuration of the flow control device 124 may be controlled by, for example, one or more control signals received from the control system 110.

The flow control device 125 may be configured to direct hydrogen gas from the second stage 120 and/or to the dispenser 106. The flow control device 125 may be implemented as a set of one or more control valves that are configurable to control the flow of hydrogen gas depending on the operating conditions of the system. For example, the flow control device 125 may be controlled to be in a first configuration wherein the output of the second stage 120 is connected to the dispenser 106 and controlled to be in a second configuration wherein the output of the second stage 120 is directed to the storage system 122. The control valve(s) may be placed in the first configuration may when the system 100/100' is storing generated and/or received hydrogen gas in storage system 122. The control valve(s) may be placed in the second configuration in other instances such as when the second stage 120 is boosting the pressure of hydrogen from the storage system 122 for dispensing via dispenser 106. The configuration of the flow control device 125 may be controlled by, for example, one or more control signals received from the control system 110.

The flow control device 126 may be configured to direct hydrogen gas from the storage device 122 to the dispenser 106 and/or the second stage 120. The flow control device 126 may be implemented as a set of one or more control valves that are configurable to control the flow of hydrogen gas during dispensing. For example, the flow control device 126 may be controlled to be in a first configuration wherein the output of the storage device 122 is connected to the dispenser 106 (e.g., hydrogen gas bypasses the second stage 120) and controlled to be in a second configuration wherein the output of the storage system 122 is connected to the second stage 120. For example, the one or more control valves may be set to the first configuration during dispensing when the hydrogen gas in the storage system 122 is at a higher pressure than the tank of a HFCV being refueled. The one or more control valves may be set to the second configuration during dispensing when the hydrogen gas in the storage system 122 approaches, is near and/or is lower than the pressure of the tank of the HFCV being refueled. The first and second configurations may correspond to a dual-mode fill capability of the hydrogen gas dispensing system, with the first configuration corresponding to a gradient fill mode and the second configuration corresponding to a boost fill mode, examples of which are described in further detail below. The fill mode of the dispensing system (e.g., the configuration of flow control device 126) may be controlled by, for example, one or more control signals received from the control system 110.

The storage system 122 may be configured to store the hydrogen gas provided by the hydrogen source 105 for dispensing via the dispenser 106. The storage system 122 may comprise a set of one or more storage devices such as one or more storage tanks. The storage system 122 may store the hydrogen at a higher pressure than the hydrogen gas is provided from the hydrogen source 105. Thus, the storage system 122 may receive the hydrogen gas from the compressor 116 after being compressed, as discussed above and in further detail below. For example, the hydrogen gas from hydrogen source 105 may be at a pressure below 100 PSI and the storage system 122 may store the hydrogen at a pressure up to approximately 6,000 PSI. As discussed above, the storage system 122 may be configured to store the hydrogen gas at a lower pressure than the maximum pressure at which hydrogen gas is dispensed. As a result, the cost, complexity, and footprint of the storage system 122 may be reduced because the storage system 122 does not need to be rated to withstand the maximum pressure at which the hydrogen gas may be delivered and can be deployed under less stringent regulatory requirements than higher pressure systems.

Further, the capacity of the storage device 122 may be limited to advantageously minimize any safety risks posed by storing compressed hydrogen gas. For example, the storage device 122 may be constructed to store no more hydrogen than a typical HFCV (such as 5-10 kilograms of hydrogen). Thus, the system 100/100' may be capable of refilling at least one standard HFCV hydrogen tank when the HFCV is empty while posing no greater safety risk than a conventional HFCV. Further, the storage system 122 may be at least partially encased in a fire retardant material to slow the spread of fire from the storage system 122 to other components in the system 100/100'. The regulatory requirements on such low capacity storage systems allows for deployment of the hydrogen gas dispensing system 100/100' in close proximity to buildings and allows for generally unrestricted access by consumers without breaching the applicable safety regulations. Accordingly, limiting the size of the storage capacity of the storage system 122 may provide any number of advantages, including, but not limited to smaller footprint, fewer limitations on where the system can be located (both from a physical and a regulatory standpoint), and a reduction in cost.

The dispenser 106 may be configured to selectively couple to a vehicle and dispense hydrogen gas to a hydrogen tank on-board the vehicle. The dispenser 106 may be, for example, configured to dispense hydrogen at a pressure up to at least the maximum output pressure of the compressor 116 (e.g., approximately 10,000 PSI according to some embodiments). The dispenser 106 may comprise a nozzle (e.g., an SAE J2600 H70 Nozzle) that selectively couples to a hydrogen gas inlet on the vehicle, a hose that fluidly couples the nozzle to components within the system 100/100', and a break-away component configured to allow the hose to break away from system 100/100' to prevent further damage to components of the dispensing system (e.g., in the event the vehicle moves away from the system 100/100' prior to disconnecting the nozzle). Further, the dispenser 106 may include electrical components to support communication between the system 100/100' and one or more computer systems in the vehicle during refueling to get information from the vehicle, such as vehicle tank pressure, temperature, and/or fill level of the hydrogen tank in the vehicle. The electrical components may be designed to communicate in accordance with a standard such as the J2799 standard set by the Fuel Cell Standard Committee as part of the Society of Automotive Engineers (SAE).

In embodiments that support electric battery charging (e.g., a hybrid refueling and recharging appliance), a power output port 108 may be configured to provide power to a vehicle, such as a HFCV and/or an electric vehicle, based on power from the power input port 102. For example, power input port 102 and/or power output port 108 may comprise power conversion circuitry configured to convert the power received at power input port 102 into a suitable format for charging a battery of a vehicle. The converted electrical power may be delivered to one or more power connections provided at power output port 108 that connect to a power input connection on the vehicle. The power conversion circuitry may be capable of providing power in a format suitable for level-1 charging and/or level-2 charging. For example, if power input port 102 comprises a three-phase electrical power connection and receives three-phase electrical power, power conversion circuitry within power input port 102 and/or power output port 108 may convert the power received at the input port to single-phase electricity at standard household levels (e.g., 120V) for level-1 charging and/or at large appliance or industrial levels (e.g., 240V) for level-2 charging. If power input port 102 receives single-phase mains electricity (either at standard household levels and/or at large appliance/industrial levels), power conversion circuitry within power input port 102 and/or power output port 108 may be configured to deliver the mains electricity to the level-1 or level-2 power output connection, respectively, with little or no conversion of the input power needed. It should be appreciated that whatever the nature of the power that power input port 102 is configured to receive, the appropriate power conversion circuitry may be included in the input and/or output port to deliver the appropriate power levels at the power output port 108 to charge a HFCV, electric vehicle (EV), hybrid vehicle, etc.

According to some embodiments, a hybrid refueling and recharging appliance comprises a power output port 108 that allows for fast DC charging. For example, power conversion circuitry of power input port 102 and/or power output port 108 may be configured to convert AC power received from the power source (e.g., a three-phase source, single-phase mains electricity source, etc.) to DC power delivered to an appropriate connector at power output port 108 to perform fast DC charging of a HFCV, EV and/or hybrid vehicle. It should be appreciated that power conversion circuitry may be integrated into any of a variety of components within the system 100/100' shown in FIGS. 1A and 1B (e.g., the power input port 102 and/or the power output port 108) or implemented in a separate component. Further, the power output by the power conversion circuitry may be employed for additional purposes separate from charging a vehicle to reduce the cost and complexity of the system 100/100'. For example, system 100/100' may comprise power conversion circuitry that distributes power to one or more components of the system (e.g., to provide power to the electrolyzer, compressor, control system, etc.).

Figure 2:
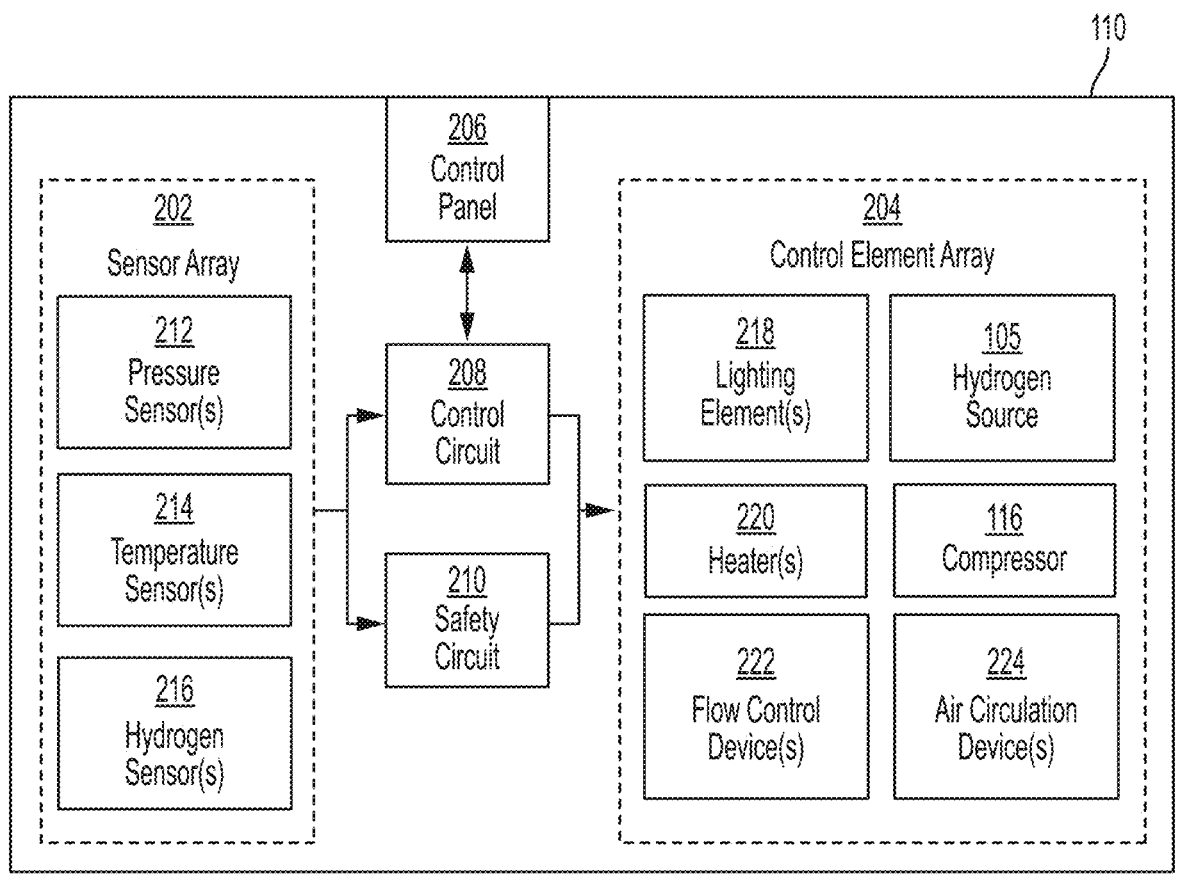
FIG. 2 illustrate a block diagram of an exemplary control system for the exemplary hydrogen gas dispensing system of FIG. 1A, in accordance with some embodiments.

The control system 110 may be configured to control one or more components of system 100/100' via control signals to control and coordinate the production, storage and/or dispensing of hydrogen gas. For example, the control system may control operation of the compressor 116, the flow control devices 124 and 126, and/or the electrolyzer 112. FIG. 2 shows an example implementation of the control system 110 in the system 100/100'. As shown, the control system 110 comprises a sensor array 202 that is configured to measure one or more parameters within the system 100/100'. The output of the sensor array 202 may be employed by a control circuit 208 to control elements in the control element array 204. The control circuit 208 may be communicatively coupled to a control panel 206 that is configured to permit a user (e.g., an operator of the vehicle) to interact with the system 100/100'. A safety circuit 210 may operate independently of the control circuit 208 and shut down one or more components in the control element array 204 when the sensor array 202 indicates that the operating conditions of the appliance 100/100' are unsafe.

The sensor array 202 may be designed to measure key parameters within the system 100/100' to ensure safe operation. For example, the sensor array 202 may comprise pressure sensor(s) 212, temperature sensor(s) 214, and/or hydrogen sensor(s) 216. The pressure sensor(s) 212 may be configured to measure the pressure at one or more points within the system 100/100', such as the pressure within the storage system 122, the pressure at the dispenser 106, the pressure within a housing of the system (e.g., see FIGS. 3A-3D) and/or the pressure at the flow control devices 124 and 126. The output of the pressure sensor(s) 212 may be employed to determine, for example, whether components within the system 100/100' are over-pressurized and likely to fail, whether components are leaking hydrogen gas, and/or a fill level of the storage system 122. The temperature sensor(s) 214 may be configured to measure a temperature at one or more points within the system 100/100', such as in the storage device 122, within the housing, or at any other component in the system. The output of the temperature sensor(s) 214 may be employed to determine, for example, whether components within the system 100/100' have frozen and/or whether components of the system have over-heated. The hydrogen sensor(s) 216 may be configured to sense the presence of hydrogen at locations within the system 100/100', such as locations within the housing that provides an enclosure for components of the system 100/100'. The output of the hydrogen sensor(s) 216 may be employed to determine, for example, whether the components of within the system 100/100' are leaking hydrogen gas and/or whether the housing is being properly ventilated.

The control circuit 208 may be configured to control elements within the control element array 204 during normal operation of the system 100/100' to perform various functions, such as generate hydrogen gas for storage, store the hydrogen gas, and dispense the hydrogen gas to a vehicle. The control circuit 208 may perform these functions based on information obtained from the sensor array 202 and/or information obtained from a vehicle received via the dispenser 106. The control circuit 208 may be implemented in any of a variety of ways. For example, the control circuit 208 may be implemented as a controller that comprises a microprocessor (e.g., a microcontroller, field programmable gate array (FPGA), processor, etc.).

Control panel 206 may be a device that is configured to interface with a human user. The control panel 206 may be, for example, configured to accept input from a user to control one or more aspects of the system (e.g., control hydrogen gas dispensing) and provide information regarding the status of the system (e.g., the status of refueling and/or recharging event) to the user, such as estimated fill time and/or charge time, amount of fuel stored in the system, amount of fuel in the tank of the HFCV or charge on the battery of an EV, etc. The control panel 206 may comprise any of a variety of interface devices, such as a touch screen, a display, a keypad, a microphone, and a speaker.

The safety circuit 210 may be configured to control elements within the control element array 204 during start-up operation of the system 100/100' for safe operation and continuously monitor the system 100/100' to identify unsafe events and shut down the system 100/100'. The safety circuit 210 may monitor the output of the sensor array 202 and shut down (or prevent from starting) one or more components in the system 100/100' responsive to the output of one or more sensors in the sensor array 202 being outside a safe operating range. The safety circuit 210 may be completely independent from the control circuit 208 such that failure of the control circuit 208 does not prevent the safety circuit 210 from ensuring the safe start-up, operation and/or shut down of system 100/100'. Further, the safety circuit 210 may be housed in fire and/or explosion proof containers within the system 100/100' to reduce the likelihood of failing due to harsh environmental conditions (e.g., a fire, an explosion, etc.). According to some embodiments, the safety circuit is configured to control the safe start-up of the system. For example, upon start-up of the system, the safety circuit may be configured to operate only a set of components before allowing the system to be powered up for operation. According to some embodiments, upon start-up of the system, safety circuit 210 is configured to first perform a number of safety checks before allowing the system to become operational. For example, the safety circuit may be configured to power-on an air circulation device (e.g., one or more fans) and confirm operation of the air circulation device before allowing the system to be power-up. Additionally, the safety circuit may be configured to ensure none of the sensors in a sensor array are detecting and/or measuring values that are outside an acceptable range. For example, safety circuit 210 may be configured to prevent operation of the system until and unless pressure sensor(s) 212, temperature sensor(s) 214 and hydrogen gas sensor(s) 216 each report safe operating levels. In this manner, safety circuit 210 is configured to limit start-up of the system to circumstances where safe conditions have been confirmed.

Additionally, safety circuit 210 may be configured to shut down the system whenever safety circuit 210 detects an unsafe condition. For example, if safety circuit 210 receives indication from any of the sensors that conditions are outside an acceptable range, safety circuit 210 may be configured to shut-down the system. According to some embodiments, if any of pressure sensor(s) 212, temperature sensor(s) 214 or hydrogen sensor(s) 216 detect and/or measure values outside an acceptable range, safety circuit 210 may be configured to shut-down the system. It should be appreciated that the safety circuit may be may be implemented in any of a variety of ways. For example, the safety circuit 208 may be implemented as a controller that comprises a microprocessor. Alternatively (or additionally), safety circuit 210 may be implemented primarily or exclusively in hardware.

Control element array 204 may comprise the elements within the system 100/100' that may be controlled by the control circuit 208 and/or the safety circuit 210. The control element array 204 may comprise, for example, lighting element(s) 218, heater(s) 220, flow control device(s) 222 (such as flow control devices 124 and 126), and/or air circulation device(s). The lighting element(s) 218 may be attached on an outer surface of an enclosure that encases the system 100/100' and have a variety of different settings (e.g., brightness, color, etc.). The settings of the lighting element(s) 218 may be controlled by the control circuit 208 to communicate information to a user. For example, the control circuit 208 may change a color of the lighting element(s) 218 based on a fill level of the storage system 122 to allow users to quickly evaluate whether the system 100/100' has stored enough hydrogen gas to fill their vehicle. The heaters 220 may be disposed proximate to the storage system or hydrogen source to prevent the hydrogen source equipment, storage tanks or any components along or within the flow path from freezing. For example, the control circuit 208 may turn on the heaters responsive to the temperature measurement received from the temperature senor(s) 214 falling below a threshold. The flow control device(s) 222, such as the flow control devices 124 and 126), in combination with the compressor 116 and/or the hydrogen source 105 may be controlled by the control circuit 208 to fill the storage system 122 with hydrogen gas and/or dispense hydrogen gas via the dispenser 106 to a vehicle. The air circulation device(s) 224 may be configured to circulate air within an enclosure that encases the system 100/100' to ensure the components remain cool. For example, the control circuit 208 and/or the safety circuit 210 may turn on the air circulation device(s) 224 automatically upon startup and/or in response to the temperature sensor(s) 214 indicating that components within the system 100/100' have exceeded a threshold temperature.

As discussed above, the hydrogen gas dispensing system may be deployed as an integrated refueling and/or recharging appliance for HFCVs, EVs or hybrid vehicles. FIGS. 3A-3D illustrate external views of an example implementation of the hydrogen gas dispensing system 100/100' deployed as a hydrogen refueling appliance 300. The appliance 300 may be designed to have a compact footprint for placement in any of a variety of locations. For example, the appliance 300 can be installed at any location having a suitable power and water connection. As shown in FIGS. 3A-3D, exemplary appliance 300 may have a height of approximately 82 inches, a length of approximately 100 inches, and a width of approximately 42.5 inches. It should be appreciated that the illustrated dimensions are non-limiting and a form factor of any suitable size and shape may be utilized.

As shown, appliance 300 comprises a housing 305 with vents 365, a display 380, a dispenser 370 with a nozzle 374 attached to a break away component 372, and a lighting element 382. The appliance 300 may be configured to dispense hydrogen gas to the storage tank of a vehicle via the dispenser 370 that is attached to the housing 305. The dispenser 370 may be an example implementation of the dispenser 106 and comprise a nozzle 374 to engage with the storage tank of a vehicle and a break-away component 372 to allow the hose to break away from housing 305 without damaging the internal components of the appliance 300 (e.g., in the event a customer drives away with the nozzle still engage with the vehicle's storage tank). The appliance 300 includes multiple vents 365 to allow venting of any gases within housing 305 of the appliance 300, for example, leaked hydrogen or oxygen by-product that is intentionally vented. The shape of the housing 306, along with the location of the vents 365 and internal circulation devices (e.g., internal air circulation devices 224) may facilitate venting of appliance 300. For example, the outlet vents may be placed near the top of the appliance 300 because gases likely to be vented may be lighter-than-air (and thereby have a tendency to rise). Further, the inlet vents may be placed near the bottom of the appliance 300 to ensure that the air being drawn in does not contain the same gases being vented. The display 380 may be an example implementation of the control panel 206 and comprise a touch panel that allows the appliance 300 to display information to the user and allows the user to provide information to the appliance 300.

Figure 4:
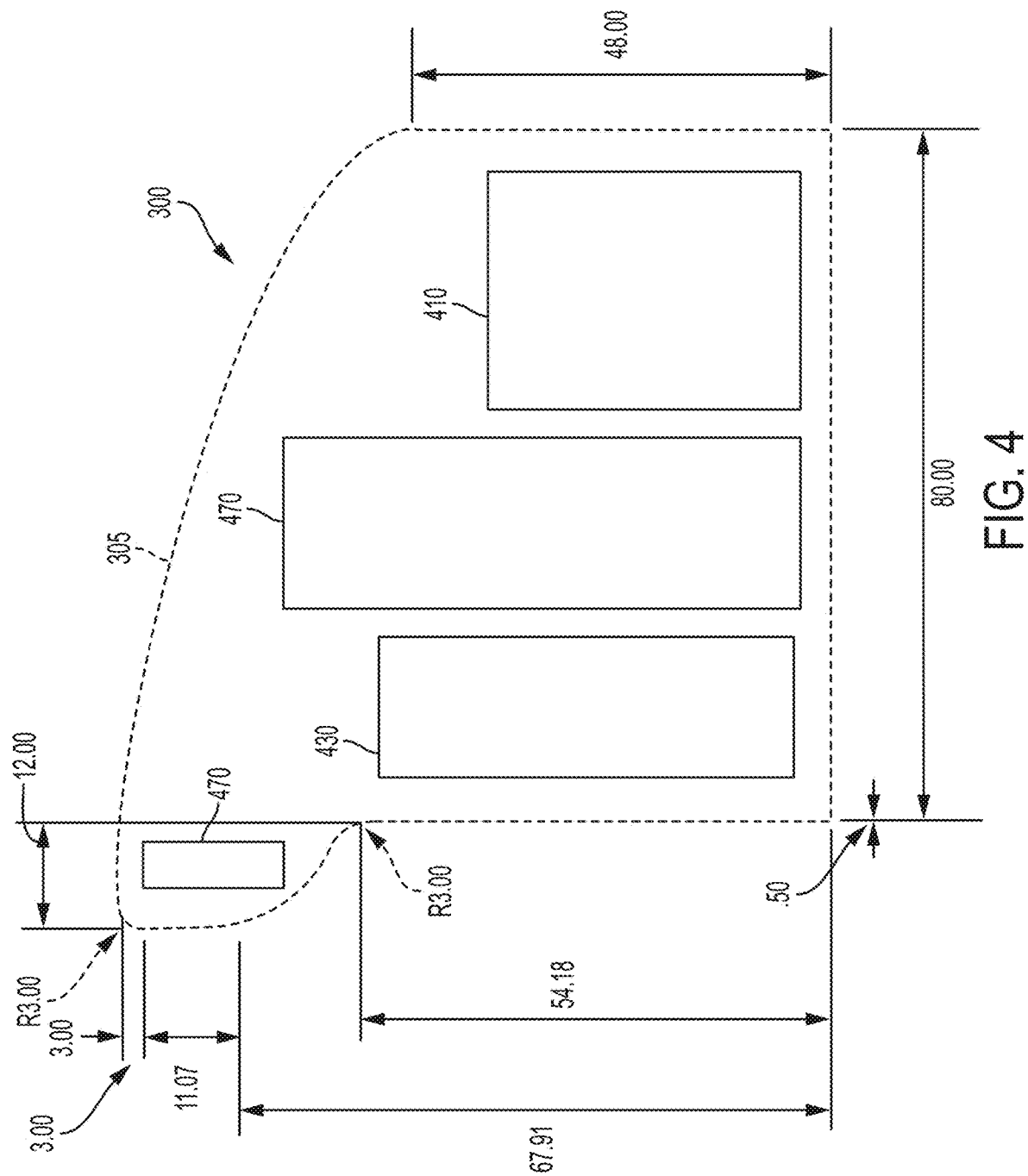
FIG. 4 illustrates exemplary internal layout a hydrogen refueling appliance, in accordance with some embodiments.

The appliance 300 may include any or all of the components described above with reference to the hydrogen gas dispensing system 100/100' that are encased within and/or attached to the housing 305. These components may be arranged within the appliance 300 in any of a variety of ways. FIG. 4 illustrates an example internal layout of the hydrogen refueling appliance 300, in accordance with some embodiments. The exemplary dimensions are shown in FIG. 4 to illustrate a non-limiting form factor that may be suitable for use in a wide array of installations. As shown, the appliance 300 comprises hydrogen source 410 (which may include an internal source such as an electrolyzer and/or may include a connection to an external source), the hydrogen storage 420 (e.g., one or more hydrogen storage tanks), a multi-stage compressor 430, and dispenser 470 that together operate to produce (and/or receive), store and dispense hydrogen fuel to vehicles. It should be appreciated that appliance 300 may contain additional components shown in FIGS. 1A and 1B that are not shown in FIG. 4 such as the gas purifier 144, the flow control devices 124 and 126, control system 110 and/or the power output port 108.

Figure 5:
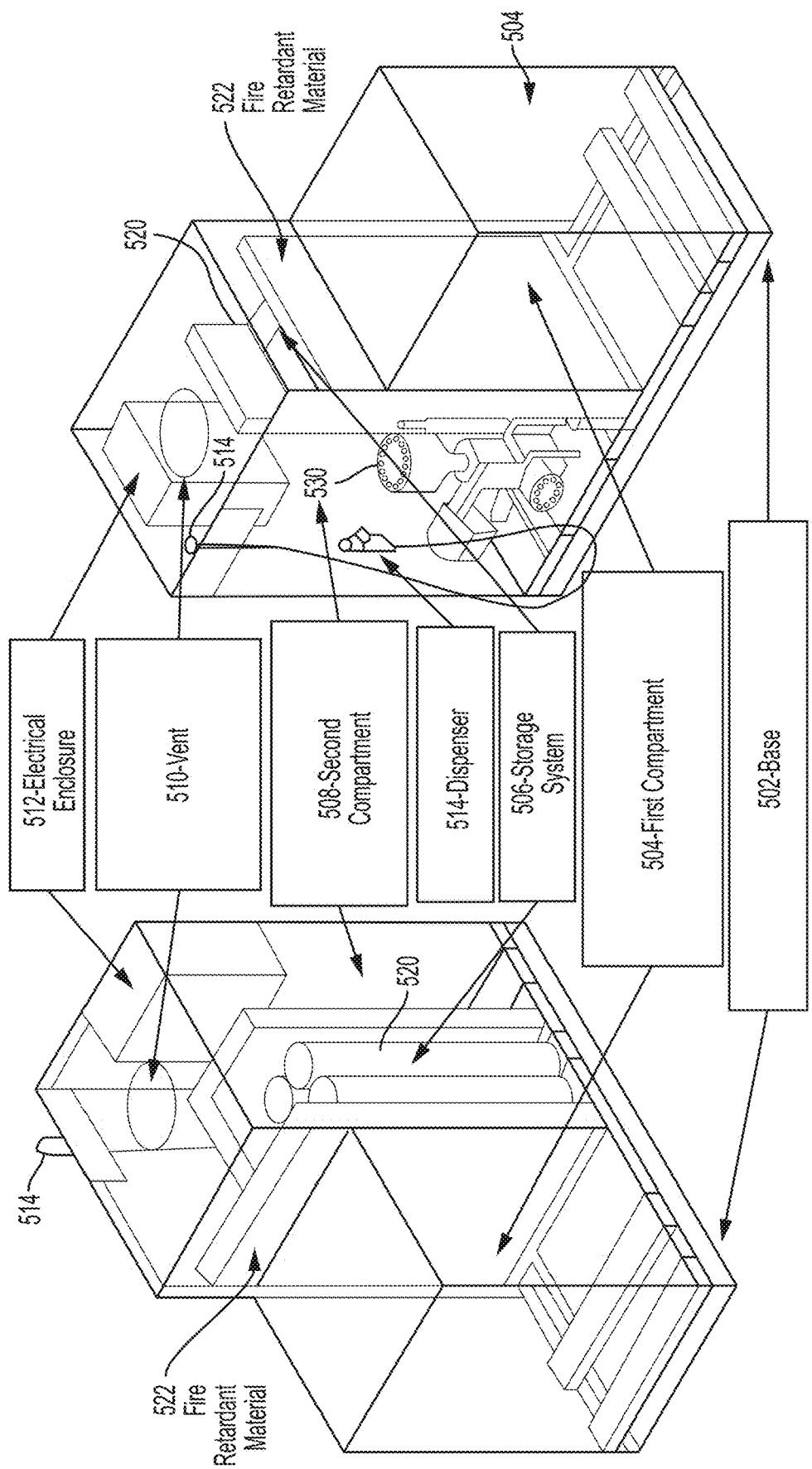
FIG. 5 illustrates exemplary detailed internal layout of a hydrogen refueling appliance, in accordance with some embodiments.

FIG. 5 illustrates an example detailed internal layout of a hydrogen refueling appliance 500. The appliance 500 may include any or all of the components described above with reference to the hydrogen gas dispensing system 100/100' and/or exemplary appliance 300 illustrated in FIGS. 3 and 4. Further, the appliance 500 may have a similar form factor and/or dimensions as the appliance 300. As shown, the appliance 500 comprises a base 502 onto which a first compartment 504 and a second compartment 508 may be disposed. The base 502 may raise the compartments 504 and 508 a fixed distance above the ground to separate any components within the compartments 504 and 508 from, for example, standing water or other unsafe potential environment condition. The first compartment 504 and/or the second compartment 508 may comprise vents 510 to safely allow the venting of gases from components disposed within the respective compartments. The first compartment 504 may be separated by the second compartment 508 by a fire retardant material 522, such as an FR-4 grade material, to facilitate containment of a fire within either the first or second compartments 504 and 508. Additionally (or alternatively), the fire retardant material 522 may at least partially encase select components within the appliance 500 to increase the inflammability of the appliance as needed. For example, the fire retardant material 522 may at least partially encase a storage system 506 that stores hydrogen gas (e.g., storage system 122) in storage devices 520.

The components of the appliance 500 may be distributed between the first and second compartments 504 and 508 in any of a variety of ways. As shown in FIG. 5, a hydrogen source (e.g., the hydrogen source 105) may be disposed in the first compartment 504 and the remaining components may be disposed in the second compartment 508. For example, the second compartment 508 may encase the storage system 506, a dispenser 514 that dispenses hydrogen gas from the appliance, a compressor 530 that compresses the hydrogen gas, and an electrical enclosure 512 (e.g., an explosion proof electrical enclosure) that holds one or more electronic devices (e.g., the control circuit 208 and/or the safety circuit 210 illustrated in FIG. 2). It should be appreciated that the components of the appliance 500 may be distributed in different fashions than shown in FIG. 5. However, the arrangement of components illustrated in FIG. 5 provides an appliance 500 that is self-contained, has a relatively small footprint and meets the various regulatory requirements.

Figure 6:
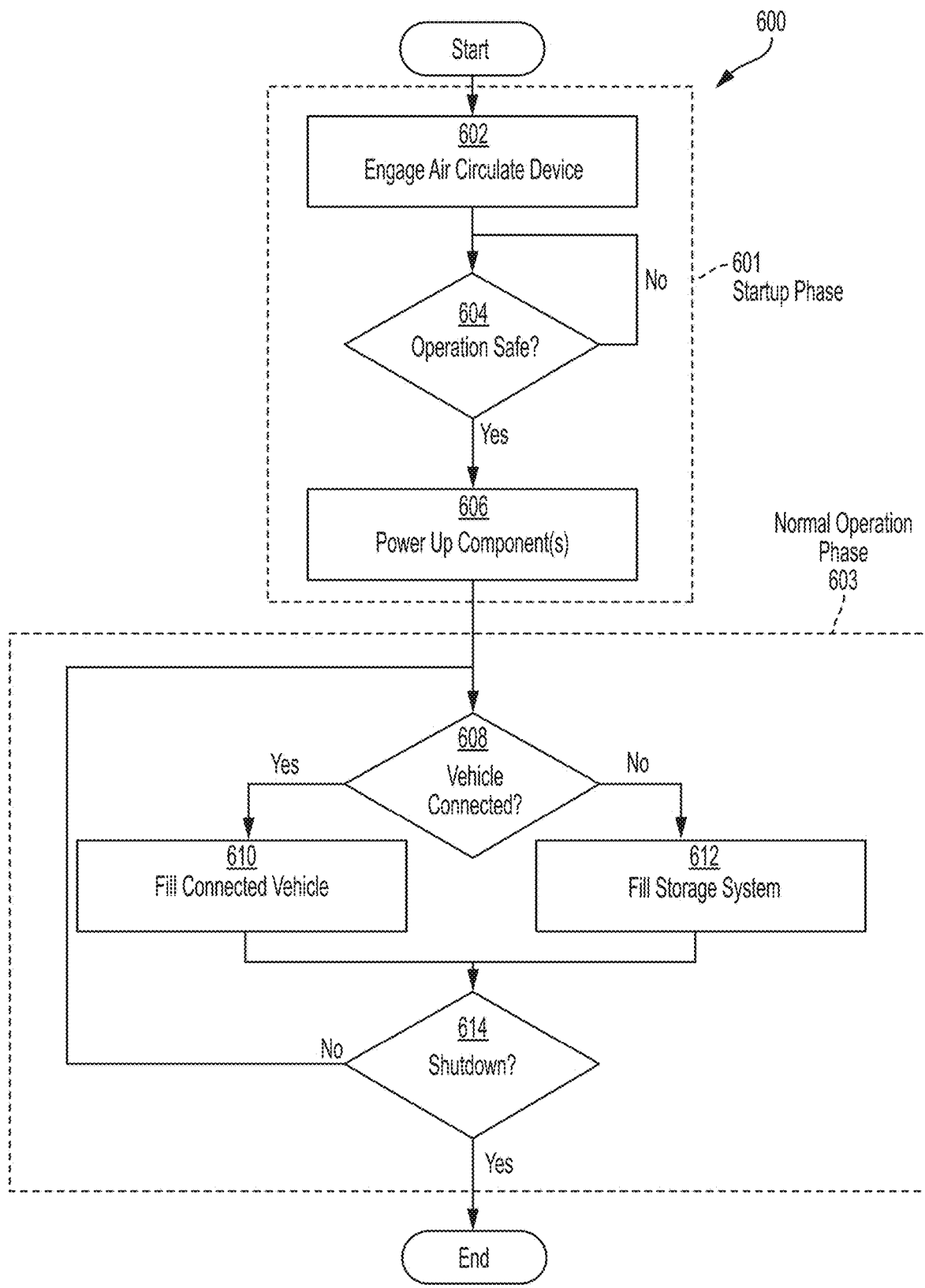
FIG. 6 illustrates a method of operating a hydrogen gas dispensing system, in accordance with some embodiments.

FIG. 6 illustrates an exemplary method of operating a hydrogen gas refueling system, for example, any of the exemplary system described herein (e.g., hydrogen gas dispensing system 100/100', appliance 300, appliance 500, etc.). As shown, method 600 comprises a startup phase 601 where the hydrogen gas dispensing system is turned on from a shutdown state and a normal operation phase 603 where the hydrogen gas dispensing system is operational and may be used to dispense hydrogen gas to vehicles and/or fill onboard storage tanks with hydrogen gas. The startup phase 601 includes, for example, an act 602 where engaging of an air circulation device is performed, an act 604 where determining whether operation is safe is performed, and an act 606 where power up of components of the system is performed. The startup phase 601 may be performed by, for example, the safety circuit 210 described in connection with FIG. 2. The normal operation phase 603 includes, for example, an act 608 of determining whether a vehicle is connected to the system, an act 610 of filling the connected vehicle, an act 612 of filling the storage system, and an act 614 of determining whether to shut down the system or remain operational. The normal operation phase 603 may be performed by, for example, the control circuit 208 in the hydrogen dispensing system 100/100' described in connection with FIG. 2.

In particular, in act 602, an air circulation device is engaged (e.g., air circulation device(s) 224 may be engaged by safety circuit 210). Act 602 may be performed by the system engaging the air circulation devices by, for example, providing power to the air circulation device. Starting the air circulation devices may begin the process of ventilating the system housing (e.g., by forcing air within the enclosure to pass by hydrogen sensors (e.g., hydrogen sensors 216) and out through exhaust vents in the housing/enclosure. As a result, the ventilation capabilities are confirmed and the system may be better able to subsequently read the output of these hydrogen sensors to determine whether any component within the system has been leaking hydrogen while the system has been shut down.

In act 604, whether operation of the system is safe is determined. Act 604 may be performed by the system determining, for example, that the output of the system sensors are within acceptable ranges (i.e., within a safe range). For example, the system may read one or more hydrogen sensors positioned in the pathway of the air circulation devices and use the output of the hydrogen sensors to determine whether the concentration of hydrogen in the air is below a safe threshold. If the system determines that operation is not safe, the system may repeat act 604 and continue to monitor the sensors to determine whether operation is safe. In act 604, additional sensors such as temperature sensors, pressure sensors, etc. may be checked to ensure that the system is safe for operation before power up the system (e.g., before proceeding to act 606. Additionally, the system may send an alert regarding the detected fault (e.g., an indication of the parameter that is outside the safe operating range) to a maintenance team. Otherwise, the system may determine that operation is safe and proceed to act 606.

In act 606, components within the system are powered up to allow the system to become operational. For example, performing act 606 may include the system providing power to all (or any portion) of the components in the system. Once the components of the system have been powered up, the system has completed the startup phase 601 and begins the normal operation phase 603 by proceeding to act 608.

In act 608, whether a vehicle is connected to the system is determined. Act 608 may be performed by the system determining whether a vehicle is connected by, for example, monitoring a pressure level in the dispenser. If the pressure detected in the dispenser is sufficiently low (e.g., approximately that of atmospheric pressure), a vehicle is likely not connected to the system. Conversely, if the pressure in the dispenser is above a threshold (e.g., above approximately 25 PSI), a vehicle is likely connected to the system. Alternatively (or additionally), the system may determine that a vehicle is connected to the system responsive to detecting communication with the vehicle via conductors integrated into the dispenser (e.g., using a standardized protocol such as J2799). According to some embodiments, one or more sensors may detect a mechanical coupling, an electrical connection, or both, between the dispenser and the vehicle to determine whether a vehicle is connected and ready for refueling. If the system determines that a vehicle is connected to the system, the system may proceed to act 610 to fill the connected vehicle. Otherwise, the system determines that a vehicle is not connected to the system and proceeds to act 612 of filling the storage system as appropriate.

In act 610, hydrogen gas may be dispensed into the connected vehicle to refuel the vehicle. Act 610 may be performed by the system filling the connected vehicle with hydrogen gas at a higher pressure than the pressure level of the hydrogen gas (if any) already in the tank of the vehicle. In a first mode, the system may dispense hydrogen gas directly from the storage system in cases where the pressure of the hydrogen gas in the storage system is greater (e.g., greater by a threshold margin) than the pressure in the tank. In a second mode, the system may boost the pressure of the hydrogen gas from the storage system using a compressor and dispense the hydrogen gas at the boosted pressure. Additional details regarding dual-mode fill techniques according to some embodiments are described below with reference to FIG. 8.

In act 612, the storage system may be filled with hydrogen gas (e.g., storage system 122 illustrated in FIGS. 1A and 1B). Act 612 may be performed by the system filling the storage system by, for example, compressing hydrogen gas from the hydrogen source (e.g., hydrogen source 105) using a compressor (e.g., compressor 116) and storing the compressed hydrogen gas in the storage system. Additional details regarding techniques for filling the storage system of a hydrogen gas refueling appliance in accordance with some embodiments are described below with reference to FIG. 7.

In act 614, it is determined whether shut down of the system is needed. For example, act 614 may be performed by the system determining whether operation of the system is safe and shutting down the system responsive to detecting one or more unsafe conditions. The system may determine whether operation is safe by, for example, checking the status of one or more system sensors, such as one or more of hydrogen sensor(s), temperature sensor(s), pressure sensors, etc., to determine whether the output from the sensor(s) is within a safe range. If the system determines that shutdown is needed (e.g., receives indication from one or more sensors or components of unsafe conditions), the system powers down components of the system and method 600 ends. For example, a safety circuit (e.g., safety circuit 210 described in connection with FIG. 2) may monitor one or more system sensors and remove power from system components when unsafe conditions are detected (e.g., one or more sensor values are outside an acceptable range). As a result, a hydrogen gas dispensing system can be checked prior to start-up and during operation of the system to ensure safe operation of the refueling appliance.

Figure 7:
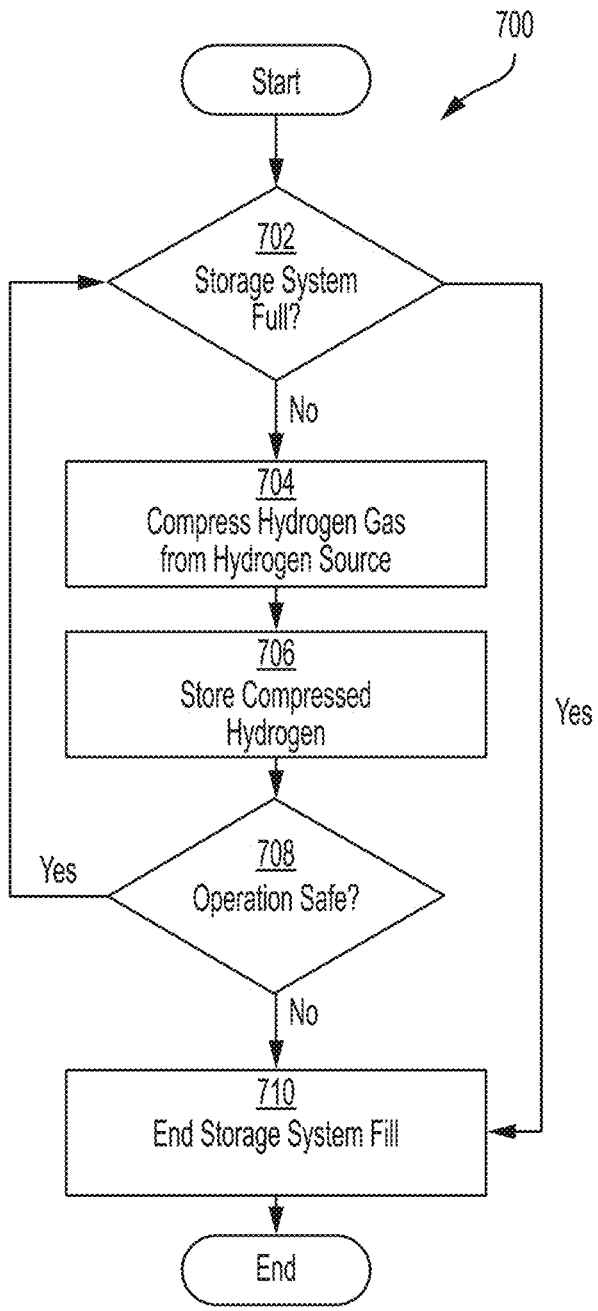
FIG. 7 illustrates a method of providing hydrogen to storage on a hydrogen gas dispensing system, in accordance with some embodiments.

FIG. 7 illustrates a method 700 of filling a storage system in a hydrogen gas dispensing system, such as the hydrogen gas dispensing system 100/100'. The method 700 may be performed in response to the system not being engaged in refueling an HFCV to renew the supply of hydrogen available for dispensing. As shown, the method 700 comprises an act 702 of determining whether the storage system is full, an act 704 of compressing the hydrogen gas from the hydrogen source, an act 706 of storing the compressed hydrogen, an act 708 of determining whether operation is safe, and an act 710 of ending the storage system fill.

In act 702, the system may determine whether the storage system is full. The pressure of the hydrogen gas stored in the storage system may be proportional to the fill level of the storage system. For example, a low pressure may be indicative of the storage system being nearly empty and a high pressure may be indicative of the storage system being full. Thereby, the system may read the output of one or more pressure sensors in the storage system and determine the fill level. If the fill level is at or above a threshold level (e.g., 100%, 99%, 98%, etc.), the system may determine that the storage system is full and proceed to act 710 of ending the storage system fill. Otherwise, the system may determine that the storage system is not full and proceed to act 704 of compressing the hydrogen gas from the hydrogen source.

In act 704, the system may compress the hydrogen gas from the hydrogen source up to a pressure level. The system may compress the hydrogen gas up to the pressure level using, for example, a compressor that fluidly coupled between the hydrogen source and the storage system. The pressure level may be between the pressure level of the hydrogen gas provided by the hydrogen source and the maximum pressure that the hydrogen gas may be dispensed to a vehicle. For example, the pressure level may be approximately 6,000 PSI in implementations where the pressure from the hydrogen source is below 200 PSI and the maximum pressure the hydrogen gas may be dispensed is approximately 10,000 PSI. The compressed hydrogen gas output by the compressor may be stored in the storage system in act 706.

In act 708, the system may determine whether operation of the system is safe. The system may determine whether operation is safe by, for example, reading the output of sensors with the system and determining whether the output from the sensors is within a safe range. If the system determines that operation is not safe, the system may return to act 702 to determine whether the storage system is full. Otherwise, the system may proceed to act 710 an end the storage system fill. For example, act 708 may be performed using techniques described in connection with act 614 described in connection with method 600 illustrated in FIG. 6.

In act 710, the system may end the storage system fill. The system may end the storage system fill by, for example, instructing the hydrogen source (e.g., electrolyzer) to stop producing hydrogen and controlling the appropriate valves between the compressor and the hydrogen source and between the compressor and the internal storage to close.

As discussed above, the hydrogen gas dispensing systems described herein can be used to refuel a vehicle using a dual-mode fill technique. For example, the dual-mode fill technique may include a gradient fill mode wherein hydrogen gas is dispensed from the storage system to the vehicle and a boost fill mode wherein hydrogen gas is dispensed from the storage system (or the hydrogen gas source) to the vehicle via a compressor that increases or "boosts" the pressure of the hydrogen gas being dispensed.

Figure 8:
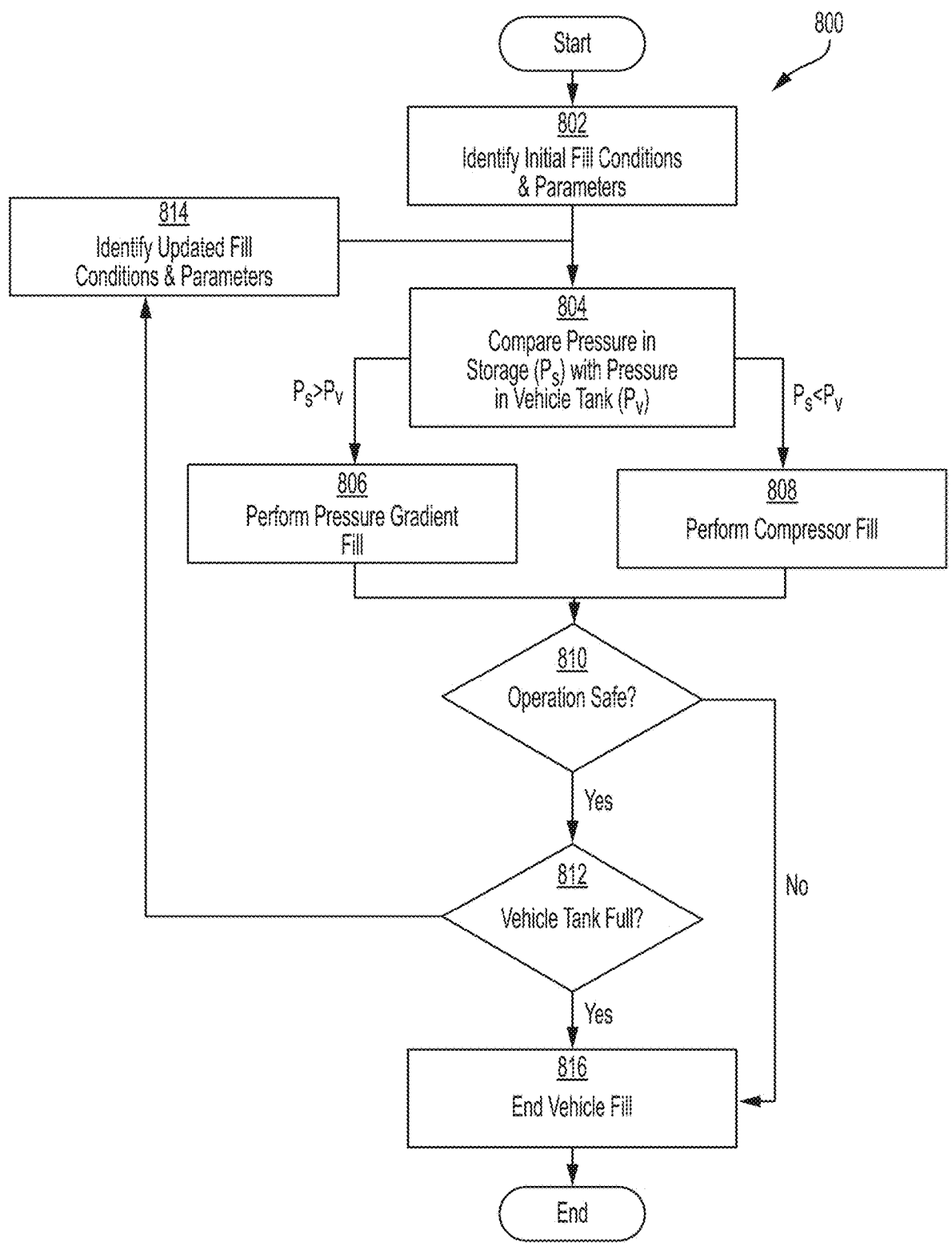
FIG. 8 illustrates a method of dispensing hydrogen from a hydrogen gas dispensing system to a vehicle, in accordance with some embodiments.

FIG. 8 illustrates an exemplary dual-mode fill technique, in accordance with some embodiments. Method 800 may be performed using, for example, the hydrogen gas dispensing systems described herein (e.g., hydrogen gas dispensing system 100/100', appliance 300, appliance 500, etc.). The method 800 may be performed in response to the system being connected to a vehicle. For example, the system may detect when the nozzle of the dispenser is inserted into the tank of the vehicle and/or the nozzle or other portion of the dispenser is activated by the user (e.g., via a button push, squeezing a trigger on the nozzle, etc.). As shown, method 800 comprises an act 802 of identifying initial fill conditions and parameters, an act 804 of comparing a pressure in the storage system ($P_S$) with the pressure in the vehicle tank ($P_V$), an act 806 of performing a pressure gradient fill, an act 808 of performing a compressor boost fill, an act 810 of determining whether operation is safe, an act 812 of determining whether the vehicle tank is full, an act 814 of identifying updated fill conditions and parameters, and an act 816 of ending the vehicle fill.

In act 802, the system may identify the initial fill conditions and parameters. For example, act 802 may be performed by the system identifying the initial fill conditions from one or more system sensors and/or by communicating with the vehicle. The initial fill conditions may comprise any of a plurality of values such as, a temperature and/or pressure of the hydrogen gas (if any) in the vehicle tank, an ambient temperature, a fill level of hydrogen gas in the vehicle tank, and/or a fill level of hydrogen gas in the storage system. The system may analyze these initial fill conditions to identify the fill parameters. For example, the system may employ a look-up table that describes the relationships between fill conditions and fill parameters to identify the fill parameters. The fill parameters may be a set of values employed to perform the vehicle refueling event. Example fill parameters include a maximum temperature for the vehicle fuel tank, a maximum hydrogen dispensing rate, and/or a maximum dispensing pressure.

In act 804, the system may compare the pressure of the hydrogen stored on the storage system ($P_S$) with the tank pressure on the vehicle ($P_V$). If the pressure of the hydrogen stored in the storage system is greater than the vehicle tank pressure ($P_S > P_V$) by a threshold amount (e.g., by 1 PSI, 5 PSI, 10 PSI, etc.), the system proceeds to act 806 to perform a pressure gradient fill (first mode). Otherwise, the system may determine that the pressure of the hydrogen stored in the storage system is insufficient for a pressure gradient fill (e.g., $P_S < P_V$, $P_S$ is sufficiently close to $P_V$ or the system determines that the fill rate is not acceptable) and proceed to act 808 to perform a compressor boost fill (second mode).

In act 806, a pressure gradient fill is performed. For example, act 806 may be performed by the system performing a pressure gradient fill by allowing hydrogen gas from the storage system to flow into the tank of the vehicle generally under the force of the existing pressure gradient between the storage system and the vehicle fuel tank. For example, one or more control devices (e.g., flow control device 126) may be controlled to allow hydrogen gas to flow from the storage system to the dispenser and into the tank of the vehicle. In such a gradient fill mode, the compressor (e.g., compressor 116) may be bypassed. The system may perform the gradient fill based on the identified fill parameters. For example, the system may control the rate of flow of hydrogen into the tank based on the identified fill parameters. The gradient fill may proceed until one or more conditions are met (e.g., $P_S < P_V$, $P_S$ is sufficiently close to $P_V$ or the system determines that the fill rate is not acceptable).

In act 808, a compressor boost fill is performed. For example, act 808 may be performed by the system boosting the pressure of hydrogen gas from the storage system (or boosting the pressure of the hydrogen gas directly from the hydrogen source, for example, in cases where the storage system is sufficiently empty) using the compressor and providing the pressurized hydrogen gas to the tank of the vehicle. For example, one or more control devices (e.g., flow control devices 124 and/or 126) may be controlled to allow hydrogen gas to flow into the compressor (e.g., compressor 116) for compression and allow the boosted hydrogen gas to be provided to the dispenser and into the tank of the vehicle. The system may perform the compressor fill based on the identified fill parameters. For example, the system may control the rate of flow of hydrogen into the tank based on the identified fill parameters. The boost fill may continue until one or more conditions are met (e.g., the tank is filled, the dispenser is disconnected from the vehicle, etc.). The boost fill performed in act 808 provides a number of advantages, including the ability to fully fill the vehicle tank to its maximum pressure without requiring the system to store hydrogen at relatively high pressures. In addition, because the system can rely on the compressor boost, the entirety of the stored hydrogen can be dispensed, unlike systems that rely solely on a gradient fill process.

In act 810, the system may determine whether operation of the system is safe. The system may determine whether operation is safe by, for example, monitoring system sensor(s) and determining whether the output from the sensors is within a safe range. If the system determines that operation is not safe, the system may proceed to act 816 to end the vehicle fill. Otherwise, the system may proceed to act 812 to determine whether the vehicle tank is full. For example, act 810 may be performed using techniques described in connection with act 614 described in connection with method 600 illustrated in FIG. 6.

In act 812, the system may determine whether the vehicle tank is full. The system may determine whether the tank is full based on, for example, a pressure required to dispense additional hydrogen into the vehicle tank and/or a pressure of the hydrogen gas in the vehicle tank. These pressures may be proportional to the fill level of the tank in the vehicle. The system may thereby determine that the vehicle tank is full responsive to the pressure required to dispense additional hydrogen into the vehicle tank and/or the pressure of the hydrogen gas in the vehicle tank being above a threshold. Additionally (or alternatively), the system may determine that the vehicle tank is full based on information obtained from the vehicle (e.g., via conductors in the dispenser that are electrically coupled to the vehicle). For example, the system may receive information indicative of a fill level of the tank and determined that the tank is full responsive to the fill level being above a threshold.

As the tank of the vehicle is being filled, the fill conditions may change. For example, the temperature of the tank of the vehicle may increase as the tank is being filled. Accordingly, the system may identify updated fill conditions and parameters in act 814. The system may identify the updated fill conditions by, for example, receiving data from one or more system sensors and/or communicating with the vehicle and, in response, generate the updated fill parameters based on the updated fill conditions.

In act 816, the system may end the vehicle fill. The system may end the vehicle fill by, for example, controlling one or more flow control devices to stop the dispensing of hydrogen gas to the vehicle.

Figure 9:
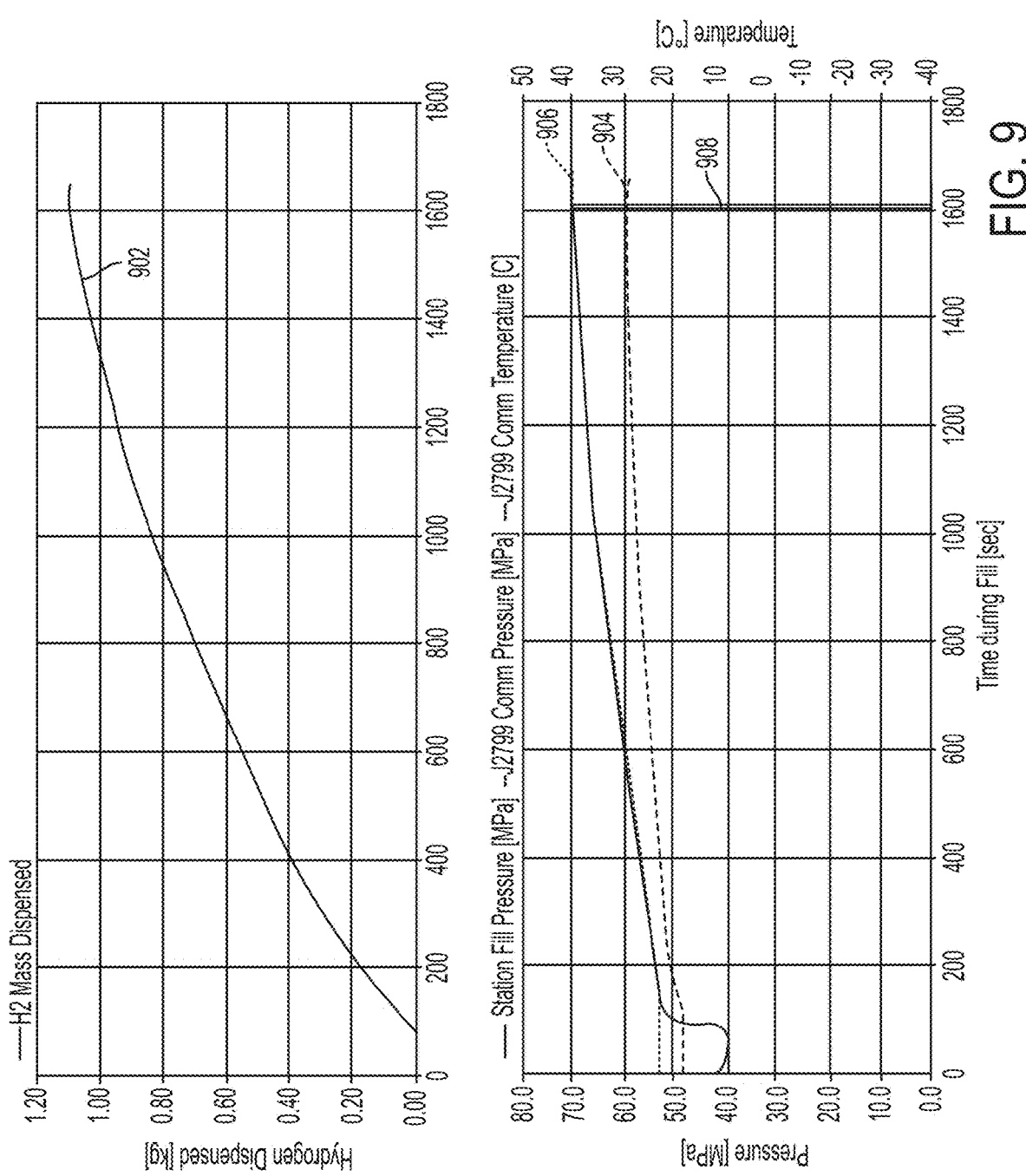
FIG. 9 is a graph showing an example vehicle fill event performed by a hydrogen gas dispensing system, in accordance with some embodiments.

FIG. 9 is a graph showing an example vehicle fill event performed by an example hydrogen gas dispensing system. As shown, the graph includes an H2 mass dispensed line 902 indicative of the mass of the hydrogen dispensed as measured in kilograms (kg), a station fill pressure line 908 indicative of the pressure of the hydrogen gas being dispensed from the system as measured in megapascals (MPa), a J2799 communication pressure line 906 indicative of the pressure in the tank of the vehicle obtained using the J2799 communication standard as measured in MPa, and a J2799 communication temperature line 904 indicative of the temperature of the tank of the vehicle obtained using the J2799 communication standard as measured in degrees Celsius (C). The graph in FIG. 9 depicts a fill event where the tank of the vehicle was topped off (e.g., the vehicle tank is filled starting from an initial fill level of at least 75%). The pressure of the hydrogen gas stored in the storage device within the system is at a pressure of approximately 43 MPa while the pressure of the hydrogen in the tank is approximately 51 MPa as indicated by as indicated by the station fill pressure line 908 and the J2799 communication pressure line 906, respectively, between 0 and 75 seconds. Accordingly, the system performs a compressor fill where the pressure of the hydrogen gas from the storage device is boosted. Thereby, the station fill pressure line 908 increases to match or exceed the J2799 communication pressure line 906 at approximately 75 seconds and hydrogen gas is dispensed. The temperature of the tank increases as the hydrogen gas is dispensed as indicated by the J2799 communication temperature line 904. The hydrogen gas is dispensed until the tank is full. In total, 1.1 kg of hydrogen gas is dispensed at an average fill rate of 25 minutes per kilogram.

Figure 10:
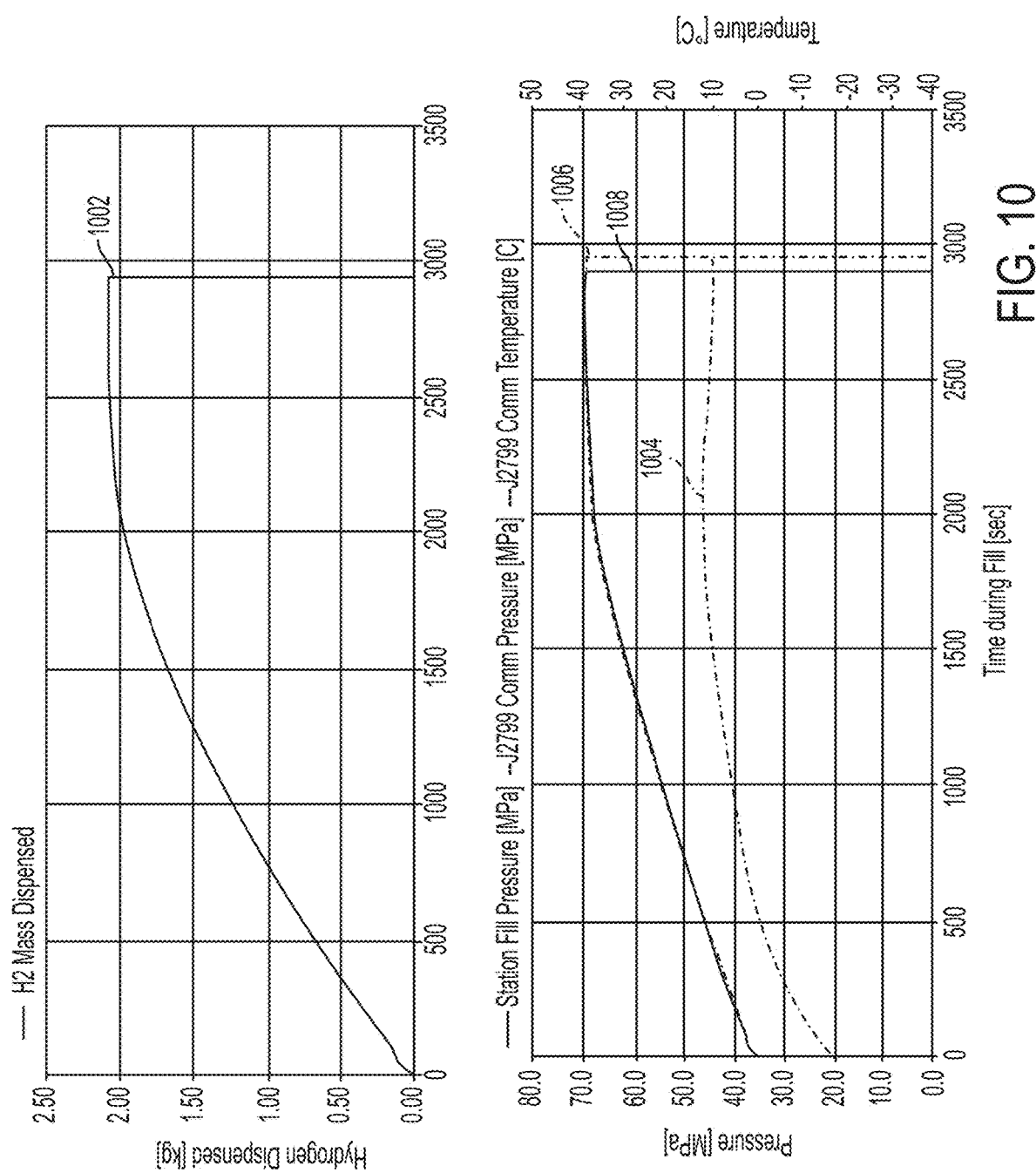
FIG. 10 is a graph showing another example vehicle fill event performed by a hydrogen gas dispensing system, in accordance with some embodiments.

FIG. 10 is a graph showing another example vehicle fill event performed by an example hydrogen gas dispensing system. As shown, the graph includes an H2 mass dispensed line 1002 indicative of the mass of the hydrogen dispensed as measured in kg, a station fill pressure line 1008 indicative of the pressure of the hydrogen gas being dispensed from the system as measured in MPa, a J2799 communication pressure line 1006 indicative of the pressure in the tank of the vehicle obtained using the J2799 communication standard as measured in MPa, and a J2799 communication temperature line 1004 indicative of the temperature of the tank of the vehicle obtained using the J2799 communication standard as measured in degrees Celsius (C). The graph in FIG. 10 depicts a larger fill event that in FIG. 9 where the storage system in the hydrogen gas dispensing system is nearly depleted approximately 2,000 seconds into the fill event. As a result, the fill rate, the rate at which hydrogen gas is dispensed is lower between 2000 seconds and 3000 seconds than between 0 seconds and 2000 seconds as shown by the H2 mass dispensed line 1002. The hydrogen gas is dispensed until the tank is full. In total, 2.1 kg of hydrogen gas is dispensed at an average fill rate of 23.3 minutes per kilogram.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor, but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The terms "approximately," "about," and "substantially" may be used to mean within ±20% of a target value in some embodiments, within ±10% of a target value in some embodiments, within ±5% of a target value in some embodiments, and yet within ±2% of a target value in some embodiments. The terms "approximately," "about," and "substantially" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A hydrogen gas dispensing system comprising:
   an electrolyzer configured to receive water and produce hydrogen gas using the water;
   a storage device configured to store the hydrogen gas up to a first pressure level;
   a dispenser configured to dispense the hydrogen gas up to a second pressure level that is higher than the first pressure level;
   a compressor fluidly coupled to the electrolyzer, the storage device, and the dispenser, the compressor configured to compress the hydrogen gas from the electrolyzer up to the first pressure level for storage and configured to compress the hydrogen gas from the storage device up to the second pressure level for dispensing via the dispenser;
   a controller configured to detect a storage pressure level of the storage device when a vehicle is coupled to the hydrogen gas dispensing system via the dispenser, the controller further configured to:
      cause hydrogen gas to flow from the storage device to a fuel tank of the vehicle via the dispenser when the storage pressure level is greater than a threshold pressure level; and
      cause hydrogen gas from the storage device to be compressed by the compressor before being dispensed to the fuel tank of the vehicle via the dispenser when the storage pressure level is less than the threshold pressure level;
   a hydrogen gas sensor configured to detect hydrogen gas in the hydrogen gas dispensing system; and
   a circuit communicatively coupled to the hydrogen gas sensor and configured to shut down at least one component of the hydrogen gas dispensing system when a hydrogen gas concentration detected by the hydrogen gas sensor exceeds a threshold.

2. The hydrogen gas dispensing system of claim 1, wherein the controller is configured to detect a vehicle pressure level of the fuel tank of the vehicle coupled to the hydrogen gas dispensing system via the dispenser, and wherein the threshold pressure level is relative to the vehicle pressure level.

3. The hydrogen gas dispensing system of claim 2, wherein the threshold pressure level is substantially the vehicle pressure level of the fuel tank.

4. The hydrogen gas dispensing system of claim 1, wherein the first pressure level is greater than or equal to approximately 5,000 and less than or equal to approximately 8,000 pounds per square inch (PSI) and the second pressure level is greater than or equal to approximately 8,000 PSI and less than or equal to approximately 12,000 PSI.

5. The hydrogen gas dispensing system of claim 4, wherein the first pressure level is approximately 6,000 pounds per square inch (PSI) and the second pressure level is approximately 10,000 PSI.

6. The hydrogen gas dispensing system of claim 1, wherein the storage device comprises a plurality of storage tanks.

7. The hydrogen gas dispensing system of claim 1, wherein the storage device is configured to store no more than approximately 10 kilograms of hydrogen gas.

8. The hydrogen gas dispensing system of claim 1, wherein the footprint of the hydrogen gas dispensing system is no larger than approximately 9 feet by approximately 18 feet.

9. The hydrogen gas dispensing system of claim 1, further comprising a hydrogen gas purifier fluidly coupled between the electrolyzer and the compressor, the hydrogen gas purifier being configured to remove at least some oxygen and/or at least some water from the hydrogen gas produced by the electrolyzer.

10. The hydrogen gas dispensing system of claim 1, further comprising:
an enclosure encasing at least the storage device and comprising an air vent; and
an air circulation device disposed in the enclosure and configured to provide ventilation for the enclosure.

11. The hydrogen gas dispensing system of claim 10, wherein the air circulation device comprises at least one fan arranged to force air from inside the enclosure to an external environment through the air vent.

12. A hydrogen gas dispensing system comprising:
an electrolyzer configured to receive water and produce hydrogen gas using the water;
a storage device configured to store the hydrogen gas up to a first pressure level;
a dispenser configured to dispense the hydrogen gas up to a second pressure level that is higher than the first pressure level;
a compressor fluidly coupled to the electrolyzer, the storage device, and the dispenser, the compressor configured to compress the hydrogen gas from the electrolyzer up to the first pressure level for storage and configured to compress the hydrogen gas from the storage device up to the second pressure level for dispensing via the dispenser;
a controller configured to detect a storage pressure level of the storage device when a vehicle is coupled to the hydrogen gas dispensing system via the dispenser, the controller further configured to:
cause hydrogen gas to flow from the storage device to a fuel tank of the vehicle via the dispenser when the storage pressure level is greater than a threshold pressure level; and
cause hydrogen gas from the storage device to be compressed by the compressor before being dispensed to the fuel tank of the vehicle via the dispenser when the storage pressure level is less than the threshold pressure level;
a pressure sensor configured to measure a change in air pressure; and
a circuit communicatively coupled to the air pressure sensor and configured to shut down at least one component of the hydrogen gas dispensing system when an air pressure level detected by the air pressure sensor indicates an issue with air circulation.

13. A hydrogen gas dispensing system comprising:
an electrolyzer configured to receive water and produce hydrogen gas using the water;
a storage device configured to store the hydrogen gas up to a first pressure level;
a dispenser configured to dispense the hydrogen gas up to a second pressure level that is higher than the first pressure level;
a compressor fluidly coupled to the electrolyzer, the storage device, and the dispenser, the compressor configured to compress the hydrogen gas from the electrolyzer up to the first pressure level for storage and configured to compress the hydrogen gas from the storage device up to the second pressure level for dispensing via the dispenser;
a controller configured to detect a storage pressure level of the storage device when a vehicle is coupled to the hydrogen gas dispensing system via the dispenser, the controller further configured to:
cause hydrogen gas to flow from the storage device to a fuel tank of the vehicle via the dispenser when the storage pressure level is greater than a threshold pressure level; and
cause hydrogen gas from the storage device to be compressed by the compressor before being dispensed to the fuel tank of the vehicle via the dispenser when the storage pressure level is less than the threshold pressure level;
a temperature sensor configured to measure a temperature of air within the hydrogen gas dispensing system; and
a circuit communicatively coupled to the temperature sensor and configured to shut down at least one component of the hydrogen gas dispensing system when a temperature level detected by the temperature sensor exceeds a threshold.

14. A hydrogen gas dispensing system comprising:
an electrolyzer configured to receive water and produce hydrogen gas using the water;
a storage device configured to store the hydrogen gas up to a first pressure level;
a dispenser configured to dispense the hydrogen gas up to a second pressure level that is higher than the first pressure level;
a compressor fluidly coupled to the electrolyzer, the storage device, and the dispenser, the compressor configured to compress the hydrogen gas from the electrolyzer up to the first pressure level for storage and configured to compress the hydrogen gas from the storage device up to the second pressure level for dispensing via the dispenser;
a controller configured to detect a storage pressure level of the storage device when a vehicle is coupled to the hydrogen gas dispensing system via the dispenser, the controller further configured to:
cause hydrogen gas to flow from the storage device to a fuel tank of the vehicle via the dispenser when the storage pressure level is greater than a threshold pressure level; and
cause hydrogen gas from the storage device to be compressed by the compressor before being dispensed to the fuel tank of the vehicle via the dispenser when the storage pressure level is less than the threshold pressure level;
a heater;
a temperature sensor configured to measure a temperature of air within the hydrogen gas dispensing system; and a circuit communicatively coupled to the temperature sensor and the heater, the circuit being configured to control operation of the heater based on a temperature level detected by the temperature sensor.

15. A hydrogen gas dispensing system comprising:

an electrolyzer configured to receive water and produce hydrogen gas using the water;

a storage device configured to store the hydrogen gas up to a first pressure level;

a dispenser configured to dispense the hydrogen gas up to a second pressure level that is higher than the first pressure level;

a compressor fluidly coupled to the electrolyzer, the storage device, and the dispenser, the compressor configured to compress the hydrogen gas from the electrolyzer up to the first pressure level for storage and configured to compress the hydrogen gas from the storage device up to the second pressure level for dispensing via the dispenser;

a controller configured to detect a storage pressure level of the storage device when a vehicle is coupled to the hydrogen gas dispensing system via the dispenser, the controller further configured to:

cause hydrogen gas to flow from the storage device to a fuel tank of the vehicle via the dispenser when the storage pressure level is greater than a threshold pressure level; and cause hydrogen gas from the storage device to be compressed by the compressor before being dispensed to the fuel tank of the vehicle via the dispenser when the storage pressure level is less than the threshold pressure level;

a first compartment having at least the storage device disposed therein;

a second compartment having at least the electrolyzer disposed therein; and a fire retardant material disposed between the first compartment and the second compartment.

16. The hydrogen gas dispensing system of claim 10, further comprising a safety system for controlling powering and depowering components of the hydrogen gas dispensing system, the safety system comprising:

the air circulation device;

a pressure sensor disposed in the enclosure and configured to measure a change in air pressure to confirm correct operation of the air circulation device;

a hydrogen gas sensor disposed in the enclosure and configured to detect hydrogen gas in the enclosure;

a temperature sensor disposed in the enclosure and configured to measure a temperature of air in the enclosure; and a safety controller coupled to the pressure sensor, the hydrogen gas sensor and the temperature sensor and configured to provide power to components of the hydrogen gas dispensing system, wherein the safety controller is configured to power and depower components of the hydrogen gas dispensing system based, at least in part, on indications received from the pressure sensor, the hydrogen gas sensor and the temperature sensor.

17. The hydrogen gas dispensing system of claim 16, wherein upon power up of the hydrogen gas dispensing system, the safety controller engages the air circulation device, the pressure sensor, the hydrogen gas sensor and the temperature sensor and provides operational power to other components of the hydrogen gas dispensing system only when the safety system confirms safe operation.

18. The hydrogen gas dispensing system of claim 16, wherein the safety controller is configured to power down the hydrogen gas dispensing system if any of the pressure sensor, hydrogen gas sensor and/or temperature sensor signal unsafe operating conditions.

19. The hydrogen gas dispensing system of claim 1, wherein the hydrogen gas dispensing system is configured to provide a visual indication of a fill level of the storage device.

20. The hydrogen gas dispensing system of claim 19, further comprising:

a lighting system configured to provide light in a selected one of a plurality of colors based on a control signal; and a circuit coupled to the lighting system and configured to generate the control signal based on the fill level of the storage device.

21. The hydrogen gas dispensing system of claim 1, wherein the system provides a standalone appliance comprising a housing containing at least the electrolyzer, the storage device and the compressor, the standalone appliance connected to a water source and an electrical source providing single-phase or three-phase electricity.

22. The hydrogen gas dispensing system of claim 21, in which the standalone appliance is connected to a single-phase electrical source providing single-phase electricity.

23. The hydrogen gas dispensing system of claim 21, in which the housing further houses the dispenser and the hydrogen gas dispensing system comprises a nozzle coupled to the dispenser, the nozzle configured to engage with the fuel tank of a vehicle to deliver hydrogen gas to the vehicle.

* * * * *